United States Patent
Katae

(10) Patent No.: US 10,037,379 B2
(45) Date of Patent: Jul. 31, 2018

(54) VOICE INPUT AND OUTPUT DATABASE SEARCH METHOD AND DEVICE

(71) Applicant: FUJITSU LIMITED, Kawasaki-shi, Kanagawa (JP)

(72) Inventor: Nobuyuki Katae, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 330 days.

(21) Appl. No.: 14/104,360

(22) Filed: Dec. 12, 2013

(65) Prior Publication Data

US 2014/0214428 A1    Jul. 31, 2014

(30) Foreign Application Priority Data

Jan. 30, 2013 (JP) .................. 2013-015654

(51) Int. Cl.
G10L 21/00 (2013.01)
G10L 25/00 (2013.01)
G06F 17/30 (2006.01)

(52) U.S. Cl.
CPC .............. G06F 17/30746 (2013.01)

(58) Field of Classification Search
CPC ......... G10L 15/22; G10L 15/30; G10L 15/19; G10L 15/265; G10L 13/00;
(Continued)

(56) References Cited

U.S. PATENT DOCUMENTS 5,802,526 A * 9/1998 Fawcett .................. G06F 3/167
348/14.06
5,802,536 A * 9/1998 Yoshii ................. G06F 15/0283
704/8
(Continued)

FOREIGN PATENT DOCUMENTS

CN    101546308    9/2009
CN    102611860    7/2012
(Continued)

OTHER PUBLICATIONS

Fujitsu Limited, "Fujitsu Develops Technology Enabling Speech-Based Information Retrieval from Smartphones", http://www.fujitsu.com/global/news/pr/archives/month/2011/20111013-02.html and http://pr.fujitsu.com/jp/news/2011/10/13-1.html, Oct. 2011.

(Continued)

*Primary Examiner* — Michael Ortiz Sanchez
(74) *Attorney, Agent, or Firm* — Fujitsu Patent Center

(57) ABSTRACT

A voice input and output database search method that includes: extracting at least one candidate keyword represented by a word or phrase from text information included in a search result; memorizing the extracted candidate keyword and a search state including the search result from which the candidate keyword is extracted in correspondence; and after a new search condition that is different from the search condition and is provided by a voice message has been recognized and a search has been conducted in accordance with this recognized search condition, when a backtracking keyword represented by a word or phrase is recognized together with a backtracking directive that is represented by a word or phrase and backtracks to a search state, controlling on the basis of memory contents so as to backtrack to a search state memorized in correspondence with a candidate keyword that corresponds to the recognized backtracking keyword.

14 Claims, 23 Drawing Sheets

(58) Field of Classification Search
CPC ......... G10L 2015/081; G10L 2015/085; G10L
2015/223; G10L 15/08; G10L 17/22;
G10L 25/48; G06F 3/167; G06F 17/30;
G06F 17/30864; G06F 17/30026; G06F
17/30755; G06F 17/30796; G06F
17/30672; G06F 17/2845; G06F
17/30654; G06F 17/30749; G06F
17/30634; G06F 17/03
See application file for complete search history.

(56) References Cited

U.S. PATENT DOCUMENTS

| | | | | |
|---|---|---|---|---|
| 6,169,986 | B1* | 1/2001 | Bowman | G06F 17/30395 |
| 6,598,039 | B1* | 7/2003 | Livowsky | G06F 17/3043 |
| 8,412,727 | B1* | 4/2013 | Das | G06F 17/30522 |
| | | | | 707/767 |
| 8,521,531 | B1* | 8/2013 | Kim | G10L 15/22 |
| | | | | 704/252 |
| 9,418,177 | B1* | 8/2016 | Lloyd | G10L 15/197 |
| 2006/0129541 | A1* | 6/2006 | Morgan | G06F 17/30637 |
| 2006/0143007 | A1* | 6/2006 | Koh | G10L 15/22 |
| | | | | 704/243 |
| 2009/0018832 | A1* | 1/2009 | Mukaigaito | G10L 15/1815 |
| | | | | 704/251 |
| 2013/0080162 | A1* | 3/2013 | Chang | G10L 15/34 |
| | | | | 704/235 |
| 2013/0145400 | A1* | 6/2013 | Chang | H04N 21/42203 |
| | | | | 725/53 |
| 2014/0120987 | A1* | 5/2014 | Kim | G06F 17/21 |
| | | | | 455/563 |
| 2014/0156279 | A1* | 6/2014 | Okamoto | G10L 15/18 |
| | | | | 704/257 |
| 2014/0229462 | A1* | 8/2014 | Lo | G06F 17/30528 |
| | | | | 707/707 |
| 2014/0279995 | A1* | 9/2014 | Wang | G06F 17/30663 |
| | | | | 707/706 |
| 2015/0161175 | A1* | 6/2015 | Yee | G06F 17/30277 |
| | | | | 707/772 |
| 2015/0213127 | A1* | 7/2015 | Chang | G06F 17/30598 |
| | | | | 707/722 |

FOREIGN PATENT DOCUMENTS

| | | |
|---|---|---|
| JP | 5-120350 | 5/1993 |
| JP | 2001-63489 | 3/2001 |
| JP | 2005-242720 | 9/2005 |

OTHER PUBLICATIONS

CNOA—Office Action of Chinese Patent Application No. 201410008601.7 dated Oct. 31, 2016, with full English Translation of the Office Action.

CNOA—Office Action of Chinese Patent Application No. 201410008601.7 dated Jul. 10, 2017, with full English translation of the Office Action.

* cited by examiner

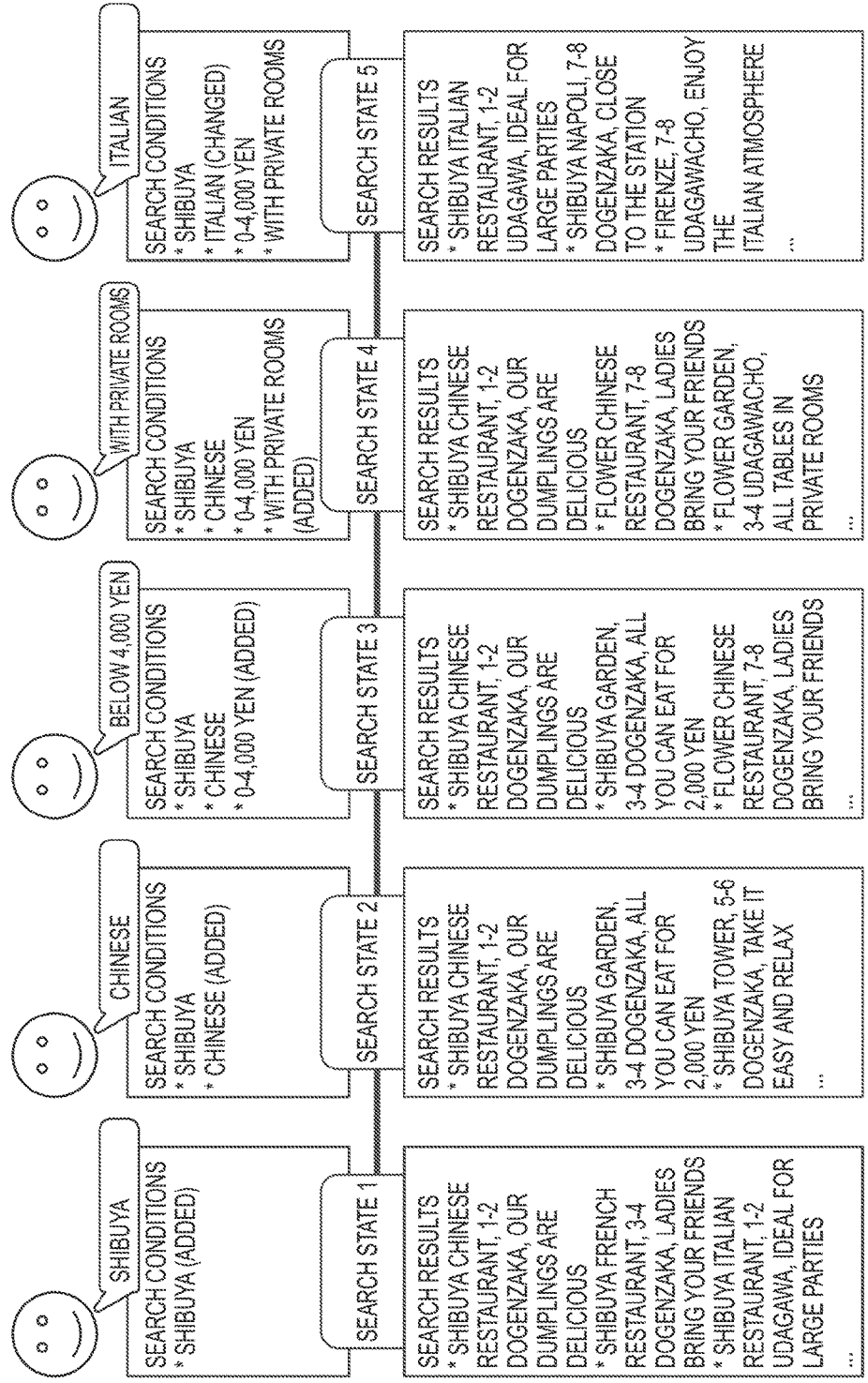

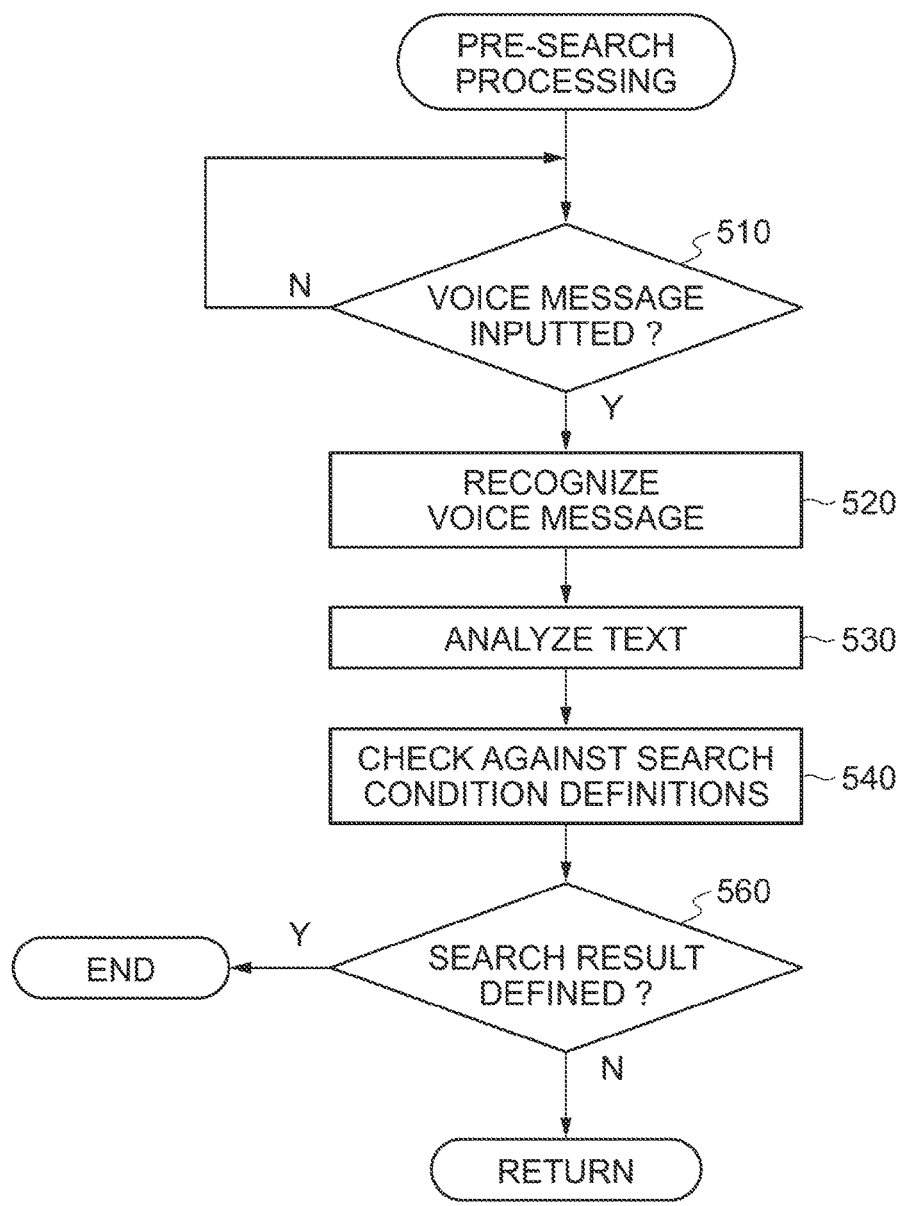

FIG.5

| INPUT WORD SET | SEARCH CONDITION/PROCESSING |
|---|---|
| CHINESE | CATEGORY: CHINESE |
| 4,000 & YEN & BELOW | BUDGET: 0-4,000 YEN |
| 4,000 & YEN & UNDER | BUDGET: 0-4,000 YEN |
| 4,000 & YEN & ABOUT | BUDGET: 3,000-5,000 YEN |
| PRIVATE ROOMS & WITH | FEATURE: WITH PRIVATE ROOMS |
| COUPONS & TAKES | FEATURE: DISCOUNT COUPONS |
| SELECT | END OF SEARCH |
| OK | END OF SEARCH |
| THAT & GOOD | END OF SEARCH |
| THAT & TELL ME | END OF SEARCH |
| KEYWORDS & TEACH | KEYWORD CHECK |

FIG.6

| NO. | SEARCH CONDITIONS | VOICE OUPUT TEXT (REPRESENTING SEARCH RESULTS) | BACKTRACKING KEYWORDS | CURRENT FLAG |
|---|---|---|---|---|
| 1 | AREA: SHIBUYA/ HARAJUKU | DINING A. THE ADDRESS IS 2-1 JINNAN. THE BUDGET IS 3,000 TO 4,000 YEN. EXCELLENT FOR SMALL PARTIES. | DINING A, JINNAN, PARTIES | 0 |
| 2 | AREA: SHIBUYA/ HARAJUKU, CATEGORY: CHINESE | KAIO. THE ADDRESS IS 3-3 SAKURAGAOKACHO. THE BUDGET IS 5,000 TO 6,000 YEN. TRY OUR FRESH SEAFOOD. | KAIO, SAKURAGAOKACHO, FRESH SEAFOOD | 0 |
| 3 | AREA: SHIBUYA/ HARAJUKU, CATEGORY: CHINESE, BUDGET: 0-4,000 YEN | SHIBUYA CHINESE RESTAURANT. THE ADDRESS IS 1-2 DOGENZAKA. THE BUDGET IS 3,000 TO 4,000 YEN. OUR DUMPLINGS ARE DELICIOUS. | SHIBUYA CHINESE RESTAURANT, DOGENZAKA, DUMPLINGS | 0 |
| 4 | AREA: SHIBUYA/HARAJUKU, CATEGORY: CHINESE, BUDGET: 0-4,000 YEN, FEATURE: WITH PRIVATE ROOMS | BATSU GARDEN. THE ADDRESS IS 1-2 UDAGAWACHO. THE BUDGET IS 3,000 TO 4,000 YEN. ALL YOU CAN EAT FOR 2,000 YEN. | BATSU GARDEN, UDAGAWACHO, ALL YOU CAN EAT | 0 |
| 5 | AREA: SHIBUYA/HARAJUKU, CATEGORY: ITALIAN, BUDGET: 0-4,000 YEN, FEATURE: WITH PRIVATE ROOMS | TRATTORIA PIACERE. THE ADDRESS IS 3-4-5 MARU. THE BUDGET IS 3,000 TO 4,000 YEN. LIKE A SPECIAL HIDEAWAY. PRIVATE ROOMS AVAILABLE. | PIACERE, MARU, HIDEAWAY | 1 |

FIG.7

| ID | AREA | CATEGORY | BUDGET | FEATURES | NAME | ADDRESS | COMMENT |
|---|---|---|---|---|---|---|---|
| 001 | SHIBUYA/ HARAJUKU | CHINESE | 3,000-4,000 YEN | PRIVATE ROOMS, DISCOUNT COUPONS | SHIBUYA CHINESE RESTAURANT | 1-2 DOGENZAKA | OUR DUMPLINGS ARE DELICIOUS |
| 002 | SHIBUYA/ HARAJUKU | CHINESE | 3,000-4,000 YEN | DISCOUNT COUPONS | BATSU GARDEN | 1-1 UDAGAWACHO | ALL YOU CAN EAT FOR 2,000 YEN |
| 003 | SHIBUYA/ HARAJUKU | CHINESE | 5,000-6,000 YEN | DISCOUNT COUPONS | KAIO | 3-2 JINNAN | TRY OUR FRESH SEAFOOD |
| 004 | SHIBUYA/ HARAJUKU | CHINESE | 5,000-6,000 YEN | PRIVATE ROOMS | MARU TOWER | 34 MARUCHO | PARTIES UP TO 100 PEOPLE |
| 005 | SHIBUYA/ HARAJUKU | JAPANESE PUB | 3,000-4,000 YEN | PRIVATE ROOMS | DINING A | 2-1 JINNAN | EXCELLENT FOR SMALL PARTIES |
| 006 | SHIBUYA/ HARAJUKU | ITALIAN | 3,000-4,000 YEN | PRIVATE ROOMS, DISCOUNT COUPONS | TRATTORIA PIACERE | 3-4-5 MARU | LIKE A SPECIAL HIDEAWAY. PRIVATE ROOMS AVAILABLE |

FIG.8

| SUBSTITUTION INFORMATION | TEMPLATE |
|---|---|
| NAME, ADDRESS, BUDGET, COMMENT | [NAME]. THE ADDRESS IS [ADDRESS]. THE BUDGET IS [BUDGET]. [COMMENT]. |
| BACKTRACKING KEYWORD 1, BACKTRACKING KEYWORD 2, BACKTRACKING KEYWORD 3, BACKTRACKING KEYWORD 4, .... | THE FOLLOWING WORDS MAY BE USED AS BACKTRACKING KEYWORDS: [BACKTRACKING KEYWORD 1], [BACKTRACKING KEYWORD 2], [BACKTRACKING KEYWORD 3], [BACKTRACKING KEYWORD 4], .... |

FIG. 10

| NO. | SEARCH CONDITION SET | VOICE OUPUT TEXT (REPRESENTING SEARCH RESULTS) | BACKTRACKING KEYWORDS | CURRENT FLAG |
|---|---|---|---|---|
| 1 | AREA: SHIBUYA/ HARAJUKU | DINING A. THE ADDRESS IS 2-1 JINNAN. THE BUDGET IS 3,000 TO 4,000 YEN. EXCELLENT FOR SMALL PARTIES. | DINING A, JINNAN, PARTIES | 0 |
| 2 | AREA: SHIBUYA/ HARAJUKU, CATEGORY: CHINESE | KAIO. THE ADDRESS IS 3-3 DOGENZAKA. THE BUDGET IS 5,000 TO 6,000 YEN. TRY OUR FRESH SEAFOOD. | KAIO, ~~DOGENZAKA,~~ FRESH SEAFOOD | 0 |
| 3 | AREA: SHIBUYA/ HARAJUKU, CATEGORY: CHINESE, BUDGET: 0-4,000 YEN | SHIBUYA CHINESE RESTAURANT. THE ADDRESS IS 1-2 DOGENZAKA. THE BUDGET IS 3,000 TO 4,000 YEN. OUR DUMPLINGS ARE DELICIOUS. | SHIBUYA CHINESE RESTAURANT, ~~DOGENZAKA,~~ DUMPLINGS | 0 |

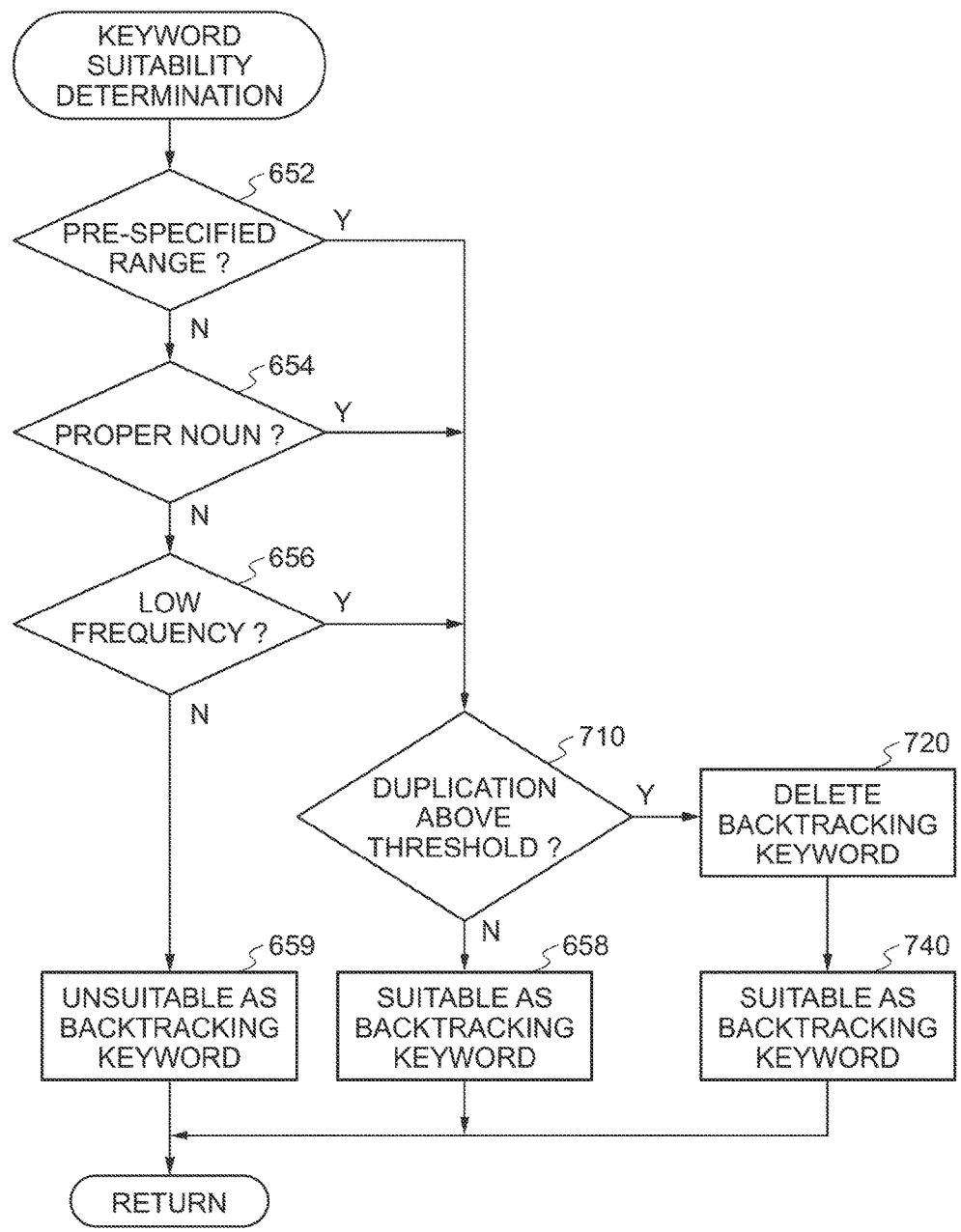

FIG.12

| NO. | SEARCH CONDITION SET | VOICE OUPUT (REPRESENTING SEARCH RESULTS) | BACKTRACKING KEYWORDS | CURRENT FLAG |
|---|---|---|---|---|
| 1 | AREA: SHIBUYA/ HARAJUKU | DINING A. THE ADDRESS IS 2-1 JINNAN. THE BUDGET IS 3,000 TO 4,000 YEN. EXCELLENT FOR SMALL PARTIES. | DINING A, JINNAN, PARTIES | 0 |
| 2 | AREA: SHIBUYA/ HARAJUKU, CATEGORY: CHINESE | KAIO. THE ADDRESS IS 3-3 DOGENZAKA. THE BUDGET IS 5,000 TO 6,000 YEN. TRY OUR FRESH SEAFOOD. | KAIO, ~~DOGENZAKA~~, FRESH SEAFOOD | 0 |
| 3 | AREA: SHIBUYA/ HARAJUKU, CATEGORY: CHINESE, BUDGET: 0-4,000 YEN | SHIBUYA CHINESE RESTAURANT. THE ADDRESS IS 1-2 DOGENZAKA. THE BUDGET IS 3,000 TO 4,000 YEN. OUR DUMPLINGS ARE DELICIOUS. | SHIBUYA CHINESE RESTAURANT, DOGENZAKA, DUMPLINGS | 0 |

FIG. 14

| NO. | SEARCH CONDITION SET | VOICE OUPUT TEXT (REPRESENTING SEARCH RESULTS) | BACKTRACKING KEYWORDS | RANK | CURRENT FLAG |
|---|---|---|---|---|---|
| 1 | AREA: SHIBUYA/HARAJUKU | DINING A. THE ADDRESS IS 2-1 JINNAN. THE BUDGET IS 3,000 TO 4,000 YEN. EXCELLENT FOR SMALL PARTIES. | DINING A, JINNAN, PARTIES | 1 1 1 | 0 |
| 2 | AREA: SHIBUYA/HARAJUKU, CATEGORY: CHINESE | KAIO. THE ADDRESS IS 3-3 SAKURAGAOKACHO. THE BUDGET IS 5,000 TO 6,000 YEN. TRY OUR FRESH SEAFOOD. | KAIO, SAKURAGAOKACHO, FRESH SEAFOOD | 1 1 1 | 0 |
| 3 | AREA: SHIBUYA/HARAJUKU, CATEGORY: CHINESE, BUDGET: 0-4,000 YEN | SHIBUYA CHINESE RESTAURANT. THE ADDRESS IS 1-2 DOGENZAKA. THE BUDGET IS 3,000 TO 4,000 YEN. OUR DUMPLINGS ARE DELICIOUS BATSU GARDEN. THE ADDRESS IS 1-2 UDAGAWACHO. THE BUDGET IS 3,000 TO 4,000 YEN. ALL YOU CAN EAT FOR 2,000 YEN. | SHIBUYA CHINESE RESTAURANT, DOGENZAKA, DUMPLINGS, BATSU GARDEN, UDAGAWACHO, ALL YOU CAN EAT | 1 1 1 2 2 2 | 0 |
| 4 | AREA: SHIBUYA/HARAJUKU, CATEGORY: CHINESE, BUDGET: 0-4,000 YEN, FEATURE: WITH PRIVATE ROOMS | BATSU GARDEN. THE ADDRESS IS 1-2 UDAGAWACHO. THE BUDGET IS 3,000 TO 4,000 YEN. ALL YOU CAN EAT FOR 2,000 YEN. | BATSU GARDEN, UDAGAWACHO, ALL YOU CAN EAT | 1 1 1 | 0 |
| 5 | AREA: SHIBUYA/HARAJUKU, CATEGORY: ITALIAN, BUDGET: 0-4,000 YEN, FEATURE: WITH PRIVATE ROOMS | TRATTORIA PIACERE. THE ADDRESS IS 3-4-5 MARU. THE BUDGET IS 3,000 TO 4,000 YEN. LIKE A SPECIAL HIDEAWAY. PRIVATE ROOMS AVAILABLE. | PIACERE, MARU, HIDEAWAY | 1 1 1 | 1 |

VOICE INPUT AND OUTPUT DATABASE SEARCH METHOD AND DEVICE

CROSS-REFERENCE TO RELATED APPLICATION

This application is based upon and claims the benefit of priority of the prior Japanese Patent Application No. 2013-015654, filed on Jan. 30, 2013, the entire contents of which are incorporated herein by reference.

FIELD

The embodiments discussed herein are related to a voice input and output database search method and a voice input and output database search device.

BACKGROUND

A service that searches a database in order to search for nearby facilities (gas stations, parking lots, convenience stores, restaurants, etc.) and suchlike has been put into practice in vehicle-mounted information terminals and the like. Searching by voice inputs and outputs rather than having to use the hands is preferable for drivers.

However, in a search by voice inputs and outputs, when search results have been narrowed down by various search conditions but the subsequent search results are unsatisfactory or the like, it is difficult to return to desired previous search conditions and search results. This is because, in a case of input and output by images or text, search conditions or search results are fixed and remain as text or images or the like on a screen or the like, but with input and output by voice messages, search conditions and search results are not fixed thus.

As a method for operating a system by voice inputs and outputs, a method of operating a system by voice inputs of arbitrary words that have been included in voice messages played by the system has been proposed.

Further, as a method for acquiring detailed information such as news items by voice inputs and outputs, a method of voice inputs of arbitrary words that have been included in a list of news headlines outputted in a voice message has been proposed. Detailed information of the news item associated with a headline that contains the arbitrary word inputted in a voice message is outputted in a voice message.

Related Patent Documents

Japanese Laid-Open Patent Publication No. 05-120350

SUMMARY

According to an aspect of the embodiments, a voice input and output database search method includes, at a computer: (a) recognizing a search condition provided by a voice message; (b) outputting a voice message representing a search result acquired by searching a database in accordance with the recognized search condition; (c) extracting at least one candidate keyword represented by a word or phrase from text information included in the search result; (d) memorizing the extracted candidate keyword and a search state including the search result from which the candidate keyword is extracted in correspondence in a memory section; and (e) after a new search condition that is different from the search condition and is provided by a voice message has been recognized and a search has been conducted in accordance with this recognized search condition, when a backtracking keyword represented by a word or phrase is recognized together with a backtracking directive that is represented by a word or phrase and backtracks to a search state, controlling on the basis of memory contents memorized in the memory section so as to backtrack to a search state memorized in correspondence with a candidate keyword that corresponds to the recognized backtracking keyword.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a conceptual diagram for describing examples of search states;

FIG. 4B is a flowchart illustrating a portion of the example of voice input and output database search processing in accordance with the first exemplary embodiment;

FIG. 5 is a conceptual diagram illustrating an example of a search condition definition table;

FIG. 6 is a conceptual diagram illustrating an example of a search state management table;

FIG. 7 is a conceptual diagram illustrating an example of a search target table;

FIG. 8 is a conceptual diagram illustrating an example of a template table;

FIG. 10 is a conceptual diagram illustrating an example of a search state management table in accordance with the second exemplary embodiment;

FIG. 11 is a flowchart illustrating an example of keyword suitability determination processing in accordance with a third exemplary embodiment;

FIG. 12 is a conceptual diagram illustrating an example of a search state management table in accordance with the third exemplary embodiment;

FIG. 14 is a conceptual diagram illustrating an example of a search state management table in accordance with the fourth exemplary embodiment;

DESCRIPTION OF EMBODIMENTS

Figure 1:
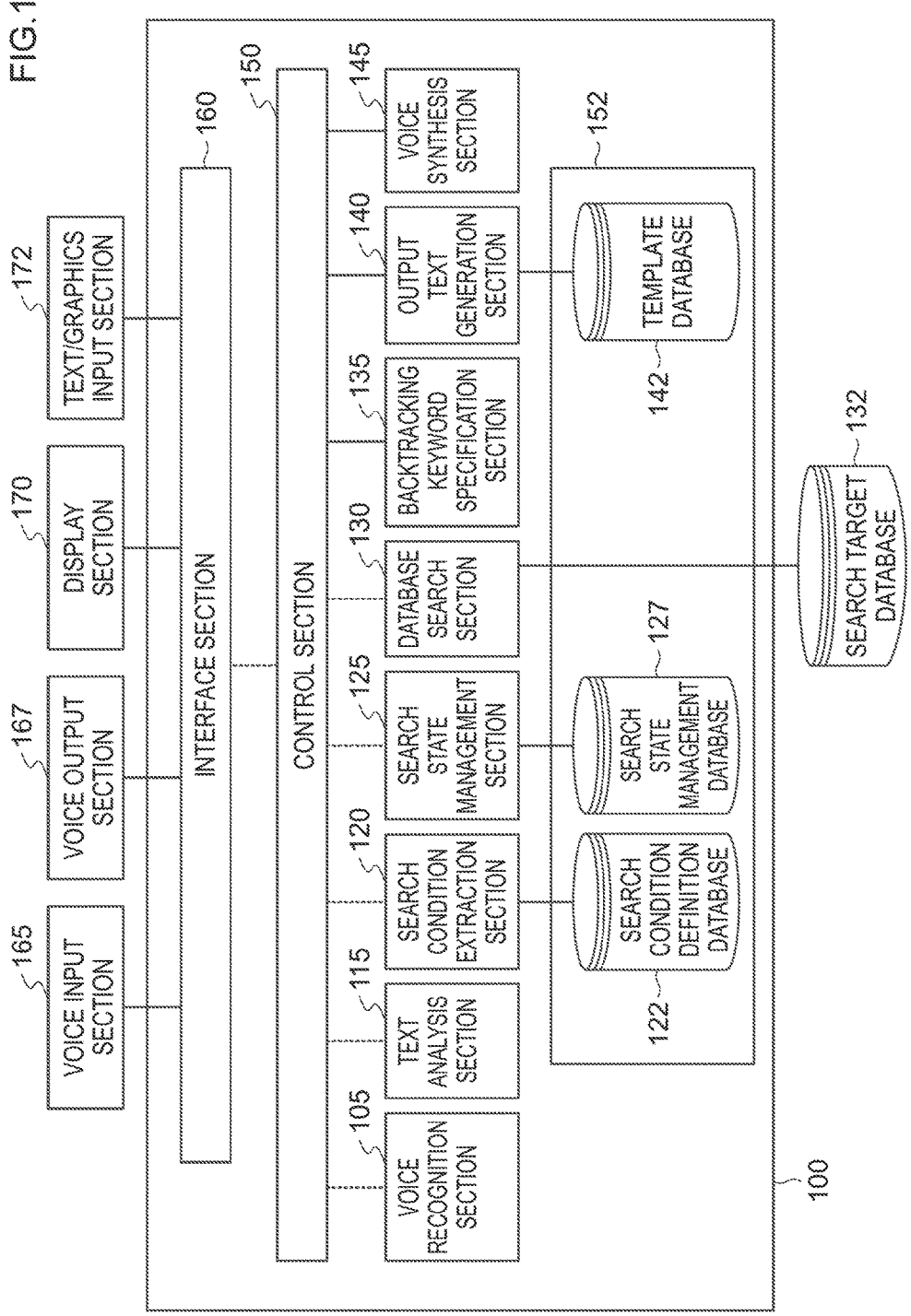
FIG. 1 is a block diagram illustrating an example of a voice input and output database search device.

Herebelow, exemplary embodiments of the disclosed technology are described in detail, referring to the attached drawings. Structural portions that are the same or correspondent are assigned the same reference numerals and descriptions thereof are omitted as appropriate.

First Exemplary Embodiment

FIG. 1 illustrates an example of a voice input and output database search device 100 according to a first exemplary embodiment. The voice input and output database search device 100 includes a control section 150, a voice recognition section 105, a text analysis section 115, a search condition extraction section 120, and a search state management section 125. The voice input and output database search device 100 further includes a database search section 130, a backtracking keyword specification section 135, an output text generation section 140, a voice synthesis section 145 and an interface section 160.

The search condition extraction section 120 is connected to a search condition definition database 122, and the search state management section 125 is connected to a search state management database 127. The database search section 130 is connected to a search target database 132. The output text generation section 140 is connected to a template database 142.

The search condition definition database 122, the search state management database 127 and the template database 142 are memorized in a memory section 152.

In this example, the memory section 152 is provided inside the voice input and output database search device 100, but may be provided outside the same. Meanwhile, in this example the search target database 132 is provided outside the voice input and output database search device 100, but may be provided inside the same.

The voice input and output database search device 100 is equipped with the interface section 160. The interface section 160 is connected with a voice input section 165, a voice output section 167, a display section 170 and a text/graphics input section 172. The voice input section 165 may be, for example, a microphone, and the voice output section 167 may be, for example, a loudspeaker. The display section 170 may be, for example, a display, and the text/graphics input section 172 may be, for example, a touch panel or a keyboard.

The control section 150 controls operations of the voice recognition section 105, the text analysis section 115, the search condition extraction section 120, the search state management section 125, the database search section 130, the backtracking keyword specification section 135, the output text generation section 140, the voice synthesis section 145 and the interface section 160.

Figure 2:
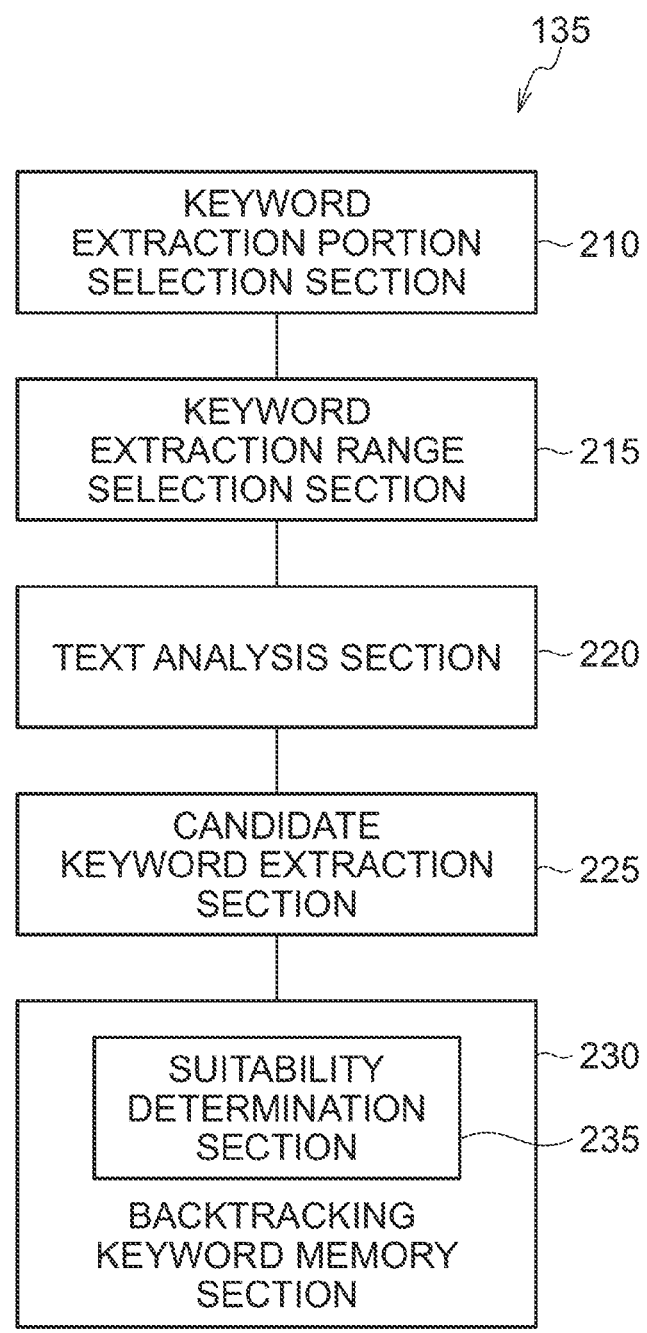
FIG. 2 is a block diagram illustrating an example of a backtracking keyword specification section.

FIG. 2 illustrates details of the backtracking keyword specification section 135. The backtracking keyword specification section 135 includes a keyword extraction portion selection section 210, a keyword extraction range selection section 215, a text analysis section 220, a keyword extraction section 225 and a backtracking keyword memory section 230. The backtracking keyword memory section 230 includes a suitability determination section 235.

The voice recognition section 105 in FIG. 1 recognizes voice messages inputted through the voice input section 165 and converts the voice messages to text information. The text analysis section 115 analyzes texts contained in the text information converted by the voice recognition section 105. The search condition extraction section 120 extracts search conditions from the analyzed texts. The database search section 130 performs searches of the search target database 132 in accordance with the extracted search conditions. The search state management section 125 administers search states.

The output text generation section 140 generates texts for voice outputs, and the voice synthesis section 145 synthesizes voice messages on the basis of the generated texts. The voice output section 167 outputs the synthesized voice messages.

The backtracking keyword specification section 135 specifies backtracking keywords. Backtracking keywords are described herebelow.

For example, if a database of restaurants is being searched by voice inputs and outputs, search conditions are inputted in voice messages, as illustrated in Table 1. The meaning of the term "search state" as used herein includes states in which search conditions are inputted and searches are conducted, as illustrated by search states 1 to 5 in FIG. 3. Search states include search conditions and search results.

Table 1 illustrates an example of search states. For ease of description, search results are not illustrated in Table 1.

TABLE 1

| | Input voice message | Search conditions |
|---|---|---|
| Search state 1 | Shibuya | Shibuya |
| Search state 2 | Chinese | Shibuya AND Chinese |
| Search state 3 | below 4,000 yen | Shibuya AND Chinese AND below 4,000 yen |
| Search state 4 | with private rooms | Shibuya AND Chinese AND below 4,000 yen AND with private rooms |
| Search state 5 | Italian | Shibuya AND Italian AND below 4,000 yen AND with private rooms |

In the search states 2 to 4, the individual search conditions inputted in the voice messages are appended and connected one to another by the logical conjunction "AND". That is, "Shibuya" in search state 1, "Shibuya AND Chinese" in search state 2 and "Shibuya AND Chinese AND below 4,000 yen" in search state 3 are search conditions in which the individual search conditions are conjoined by AND. The search results of searches according to plural search conditions conjoined by AND are results that satisfy all of the plural search conditions.

In search state 5, the "Chinese" in the search conditions "Shibuya AND Chinese AND below 4,000 yen AND with private rooms" of search state 4 is changed to "Italian". This is because "Chinese" and "Italian" are the same attribute (types of cuisine).

If, for example, a user wants to return from search state 5 to search state 3, that is, to remove the search condition "with private rooms" and change "Italian" back to "Chinese", the following methods may be employed.

(1) Displaying a display of the current search state and displaying previous search states at a reduced size in sequence. The user returns to a search state illustrated in the reduced-size display by selecting the reduced-size display of the desired search state from among the reduced-size displays of previous search states that are displayed.

(2) Specifying a desired search state by a relative distance from the current search state. For example, if a voice input at search state 5 is "move backward two", the search state is returned to search state 3.

(3) Specifying a desired search state by the search condition that was inputted. For example, if a voice input is "below 4,000 yen", the search state is returned to search state 3, the point at which "below 4,000 yen" was inputted in a voice message to be a search condition.

(4) Specifying a desired search state by an individual search condition included in the search conditions conjoined by ANDs. For example, if "Chinese" is inputted in a voice message, the search state is returned to any of the search states 2 to 4 that include "Chinese" as a search condition.

Method (1) depends on a screen display. Therefore, it is not suitable for a database search device that conducts searches in accordance with voice inputs and outputs. In a database search device that performs searches in accordance with a graphical user interface (GUI), the display of previous search states may be displayed on a screen in addition to a current search state. Thus, it is relatively easy for a user to return to a desired search state by selecting the desired search state from the display of previous search states.

Method (2) increases a burden on the user. That is, it is difficult to use this method unless the user can remember relative distances between current search states and desired search states.

Similarly, method (3) increases the burden on the user. That is, it is difficult to use this method unless the user can remember the search condition that was inputted in a voice message at the desired search state.

According to method (4), the user burden is relatively small. However, the likelihood that a large number of search states correspond to the search condition inputted in a voice message is high. Therefore, the likelihood of returning to the desired search state is reduced.

When voice inputs are employed in the aforementioned method of operating a system and method of retrieving detailed news information, there is only a small possibility of an arbitrary word that is inputted in a voice message relating to a large number of operations or a large number of news items. This is because the number of words associated with system operations or words included in a headline list is limited.

In contrast, in searches of a database, the likelihood of many words being used as search conditions is high, and there is a high likelihood of a search condition that is inputted in a voice message relating to a large number of search states.

Given the above, in the voice input and output database search device 100, a method in which a desired search state may be specified by a search condition, which is to say a keyword, as in method (4) but in which only a few search states correspond to the keyword is effective.

These keywords are referred to as "backtracking keywords". In the present disclosed technology, one or more candidate keywords to be candidates for backtracking keywords are extracted from words and phrases included in search results, and keywords among the candidate keywords that are suitable to be backtracking keywords are memorized in correspondence with search states. A phrase contains a plural number of words.

It is preferable if the number of backtracking keywords is not a very large number. If the number of backtracking keywords is large, the likelihood of returning to a desired search state is reduced. Further, if the number of backtracking keywords is large, the recognition accuracy of voice recognition is likely to fall. Further still, when the number of backtracking keywords is small, it is easier for a user to retain them in memory.

FIG. 4A to FIG. 4I illustrate an example of voice input and output database search processing.

Figure 4A:
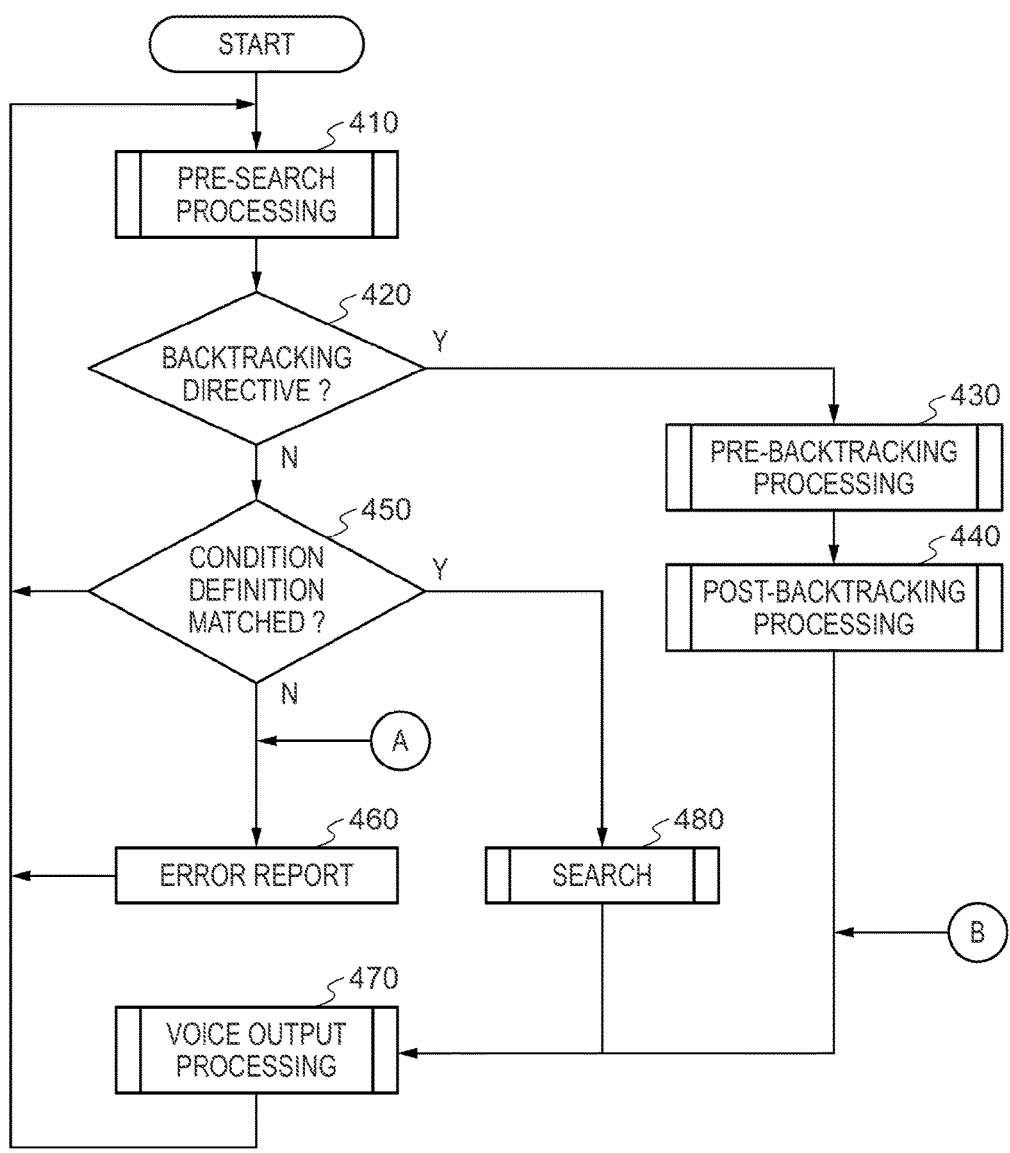
FIG. 4A is a flowchart illustrating an example of voice input and output database search processing in accordance with a first exemplary embodiment.

As illustrated in FIG. 4A, in step 410 the voice input and output database search device 100 performs pre-search processing. Details of the pre-search processing are illustrated in FIG. 4B. In step 510, the voice input and output database search device 100 waits until a voice message is inputted via the voice input section 165. When a voice message is inputted, in step 520 the voice recognition section 105 conducts voice recognition and converts the voice message to text.

In step 530, the text analysis section 115 retrieves words included in the text by performing a text analysis of the converted text. In step 540, the search condition extraction section 120 extracts a search condition by checking the retrieved words against words included in an input word set field of a search condition definition table that is included in the search condition definition database 122, of which an example is illustrated in FIG. 5.

The search condition definition table includes an input word set field and a search condition/processing field.

The search condition definition table illustrated in FIG. 5 is an example of a search condition definition table for searching a database of restaurants. The search condition definition table defines input word sets, which are combinations of words obtained by voice recognition and text analysis of input voice messages, and defines search conditions and processing for searches that are related to these combinations of words. For example, if the word "Chinese" is included in an input voice message, the "category" being "Chinese" is set as a search condition. If the words "4,000", "yen", and "below" are included in an input voice message, the "budget" being "0-4,000 yen" is set as a search condition.

When a plural number of words are included in an input word set, as in the case of "4,000", "yen", and "below", the words may be determined not to correspond with the associated search condition if an input sequence of the words is not the same as a sequence of the words in the input word set. Alternatively, the words may be determined to correspond with the associated search condition even if the input sequence of the words is different from the sequence of the words in the input word set.

In the search condition definition table of this example, when "select", "OK", a set of "that" and "good", or a set of "that" and "tell me" is included in an input voice message, then rather than defining a search condition, this is used to define processing. In this case, the processing memorized in relation to these words is the end of a search. When a user desires the end of a search, a voice input such as "that's good" or "tell me about that" is sufficient.

Note that "select", "OK", the set of "that" and "good", the set of "that" and "tell me", and the like are examples, and words indicating the end of a search are not restricted to these.

As examples, the results of morphological analysis if a voice input is (A) "Chinese is good", (B) "one at below 4,000 yen", (C) "OK", or (D) "the previous restaurant on Dogenzaka" (Dogenzaka is a street address) are illustrated in Table 2. This morphological analysis is an example of text analysis. Examples of methods of morphological analysis include the Viterbi algorithm, the longest match method and the like, but these are not restrictive.

TABLE 2

| (A) | Chinese common noun | is copula | good adjective | | |
|---|---|---|---|---|---|
| (B) | one common noun | at preposition | below preposition | 4,000 number | yen numerical classifier |
| (C) | OK adjective | | | | |
| (D) | the article | previous adjective | restaurant common noun | on preposition | Dogenzaka proper noun |

Voice input (A) is a text containing the word "Chinese", which corresponds with "Chinese" in the input word set field of the search condition definition table. Accordingly, if voice input (A) is inputted in a voice message, the search condition "category: Chinese" is determined.

Voice input (B) is a text containing the words "4,000", "yen" and "below", which corresponds with "4,000", "yen" and "below" in the input word set field of the search condition definition table. Accordingly, if voice input (B) is inputted in a voice message, the search condition "budget: 0-4,000 yen" is determined.

Voice input (C) is a text containing the word "OK", which corresponds with "OK" in the input word set field of the search condition definition table. Accordingly, in this case the processing is determined to be "end of search", that is, defining a search result.

Voice input (D) is a text containing the words "the", "previous", "restaurant", "on" and "Dogenzaka". These words do not correspond with any of the words contained in the input word set field of the search condition definition table. Accordingly, it is determined that neither a search condition nor processing is being defined.

In step 560, a determination is made as to whether or not a search result has been defined. For example, a search result is defined in response to voice input (C). In consequence, the voice input and output database search processing ends.

If it is determined in step 560 that no search result has been defined, as illustrated in FIG. 4A, a determination is made in step 420 as to whether or not a backtracking directive is included in the text.

A backtracking directive is a word or phrase that is used together with a backtracking keyword. When a backtracking directive is appended to a backtracking keyword, it is determined that the input voice message is not requesting a search of the search target database 132 but is requesting backtracking to a desired search state.

For example, if a backtracking keyword to a previous search state is "Shibuya Chinese Restaurant", it is possible to return to that search state by a voice input of "the previous Shibuya Chinese Restaurant". In this example, the backtracking directive is "the previous".

Backtracking directives are not restricted to "the previous". For example, there may be "you said before", "back to" and the like.

For example, if the language being used is Japanese and a backtracking keyword to a previous search state is "渋谷飯店",
that search state may be easily returned to by a voice input of
"さっきの渋谷飯店".
In this example, the backtracking directive is
"さっきの".
Backtracking directives are not restricted to this. For example,
"前に言った"
may be a backtracking directive, such as in
"前に言った 渋谷飯店".

As another example, if the language being used is Chinese and a backtracking keyword to a previous search state is
"涩谷饭馆",
that search state may be easily returned to by a voice input of
"刚才的涩谷饭馆".
In this example, the backtracking directive is
"刚才的".
Backtracking directives are not restricted to this. For example,
"说前的"
may be a backtracking directive, such as in
"说前的涩谷饭馆".

Languages that may be used are not restricted to English, Japanese and Chinese. For example, German, French and so forth may be used.

Figure 4C:
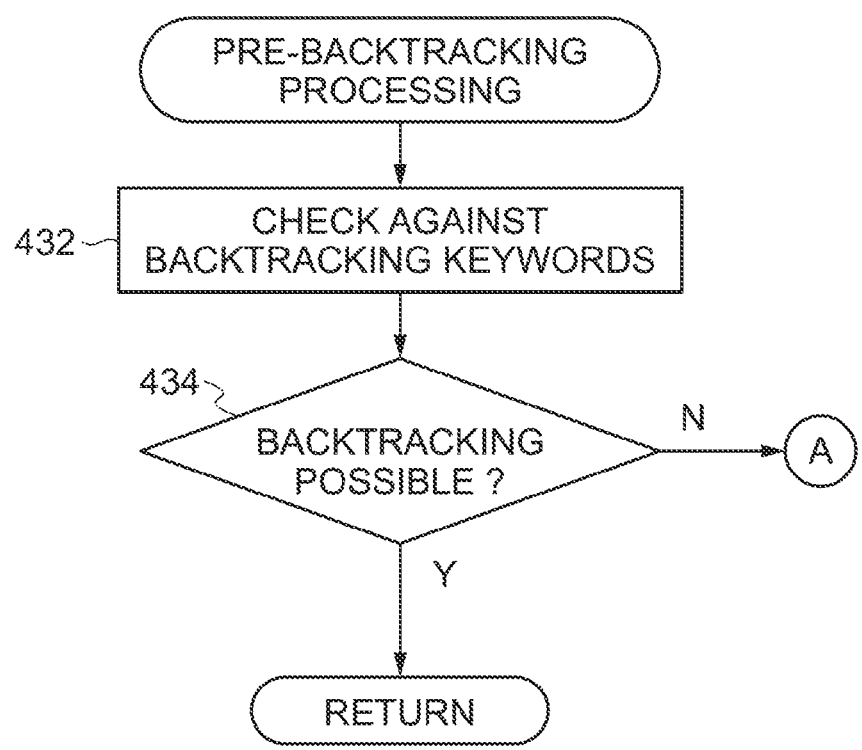
FIG. 4C is a flowchart illustrating a portion of the example of voice input and output database search processing in accordance with the first exemplary embodiment.

If a backtracking directive is included, pre-backtracking processing is carried out in step 430. Details of the pre-backtracking processing of step 430 are illustrated in FIG. 4C.

In step 432, the search state management section 125 checks words included in the text against backtracking keywords contained in a search state management table of the search state management database 127.

An example of the search state management table is illustrated in FIG. 6. The search state management table contains search state records, which correspond with individual search tasks of the database search processing. This search state management table is an example, which includes a search condition field, an output voice message text field representing search results, a backtracking keyword field, and a current flag field representing the position of a current search state. However, the fields of the search state management table are not restricted to these, and any of these may be excluded. For example, the search state management table may contain the search results corresponding with search conditions.

If none of the backtracking keywords in the search state management table matches any of the words contained in the text, in step 434 it is determined that there is no previous search state that can be backtracked to. In this case, in step 460 of FIG. 4A, an error message is given via the voice output section 167. That is, a warning indicating that the input voice message could not be properly interpreted is given in a voice message.

If any of the backtracking keywords matches any of the words contained in the text, in step 434 it is determined that there is a previous search state that can be backtracked to, and post-backtracking search processing is carried out in step 440 of FIG. 4A.

Figure 4D:
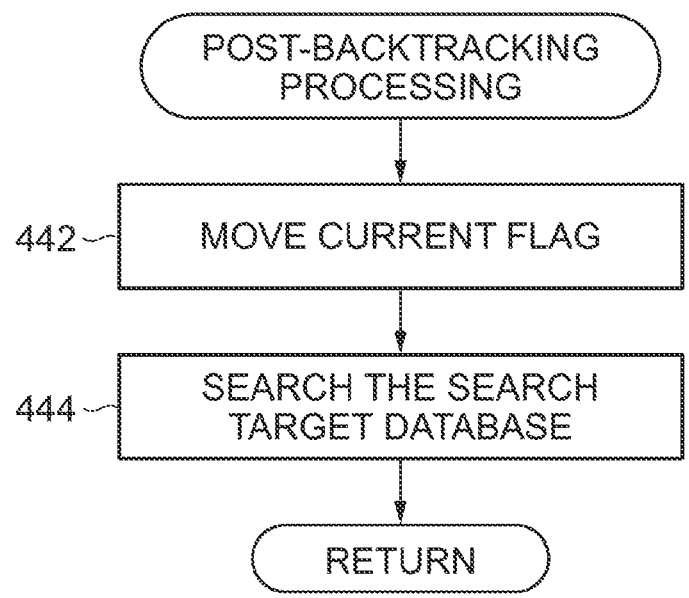
FIG. 4D is a flowchart illustrating a portion of the example of voice input and output database search processing in accordance with the first exemplary embodiment.

Details of the post-backtracking search processing are illustrated in FIG. 4D. In step 442, the search state management section 125 moves the current flag to the current flag field of the search state record containing the backtracking keyword that matches the word contained in the text. In this case, as an example, the current flag field with the current flag is set to "1" and current flag fields without the current flag are set to "0".

For example, voice input (D) of Table 2 contains "the previous", which is an example of a backtracking directive. Therefore, in step 432, the backtracking keywords contained in the backtracking keyword fields of the search state management table are checked against "restaurant", "on" and "Dogenzaka". "Dogenzaka", which is included in voice input (D), is included in the backtracking keywords of search state record No. 3. Accordingly, in step 442, the current flag field of search state record No. 3 is set to 1, and the current flag field of record No. 5 is set to 0.

In step 444, the database search section 130 searches the search target database 132 using the search conditions of the search state record with the current flag in the search state management table.

FIG. 7 illustrates an example of a search target table of the search target database 132. In this example, the search target database 132 is a database of restaurants and includes fields for, as an example, ID numbers, areas, categories, budgets, features, names, addresses, comments and so forth. The comments field contains, for example, promotional messages from the restaurants.

Figure 4E:
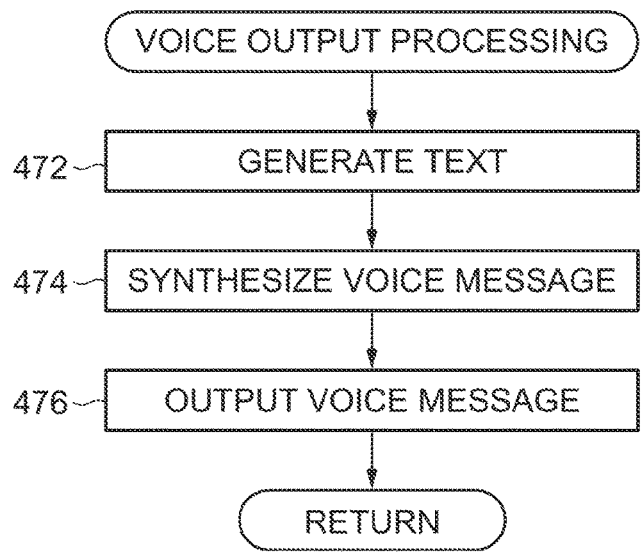
FIG. 4E is a flowchart illustrating a portion of the example of voice input and output database search processing in accordance with the first exemplary embodiment.

When a search result is acquired, the voice output processing in step 470 of FIG. 4A is performed. Details of the voice output processing are illustrated in FIG. 4E. Using a template table contained in the template database 142, the output text generation section 140 generates an output voice message text based on text contained in the search result.

As an example, Table 3 illustrates a case in which the record in FIG. 7 with 001 in the ID field is acquired as a search result in the search of step 444.

TABLE 3

| Field | Contents |
|---|---|
| Area | Shibuya/Harajuku |
| Category | Chinese |
| Budget | 3,000-4,000 yen |
| Features | Private rooms, discount coupons |
| Name | Shibuya Chinese Restaurant |
| Address | 1-2 Dogenzaka |
| Comment | Our dumplings are delicious. |

FIG. 8 illustrates an example of the template table in the template database 142. This template table includes, as an example, a substitution information field and a template field.

A search result includes information such as the "name", "address", "budget" and "comment" included in the substitution information field of the template table. Accordingly, an output voice message text is generated applying the template corresponding to this information, that is, a template saying "[Name]. The address is [address]. The budget is [budget]. [Comment]."

Thus, an output voice message text is generated saying "Shibuya Chinese Restaurant. The address is 1-2 Dogenzaka. The budget is 3,000 to 4,000 yen. Our dumplings are delicious."

In step 474, the voice synthesis section 145 synthesizes an output voice message using the generated output voice message text. In step 476, the voice output section 167 outputs the synthesized output voice message.

The processing in step 444 of searching the search target database 132 may be omitted. For example, the search results of a search that is performed when a search state record is generated may be memorized in the search state management table or the memory section 152, and these search results may be read from the search state management table or the memory section 152 and outputted in a voice message. Alternatively, data in an output voice message field of a corresponding search state record of the search state management table may be outputted in a voice message.

If it is determined in step 420 of FIG. 4A that no backtracking directive is included, then in step 450 a determination is made as to whether any of the words contained in the text matches any of the word sets contained in the input word set field of the search condition definition table. If there is no matching word in the input word set field, an error message is given in step 460. That is, a warning indicating that the input voice message could not be interpreted is given in a voice message.

Figure 4F:
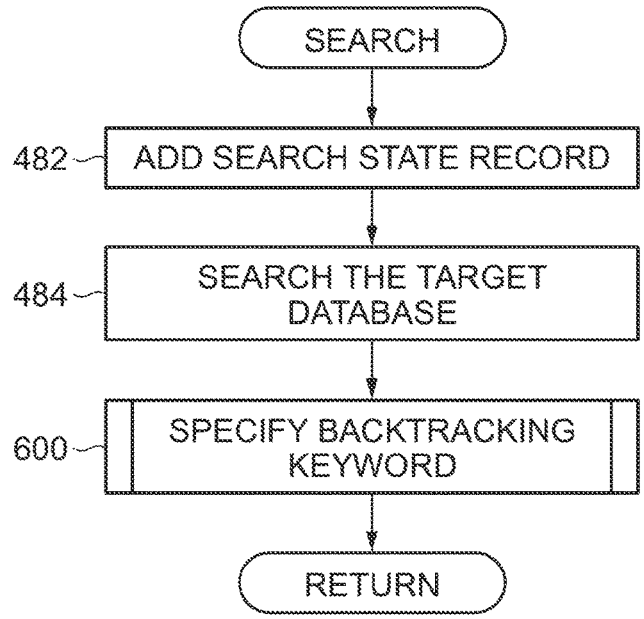
FIG. 4F is a flowchart illustrating a portion of the example of voice input and output database search processing in accordance with the first exemplary embodiment.

When there is a word in the input word set field matching any of the words contained in the text, search processing is performed in step 480. Details of the search processing in step 480 are illustrated in FIG. 4F.

In step 482, a new search state record is added to the search state management table, and search conditions are set in the search condition field of this search state record. If the search condition in this case is for the first search task of the database search processing, the search conditions are just the search condition corresponding to the input word set. If the search conditions are for a second or subsequent search task, the present search condition is, for example, conjoined with previous search conditions by "AND". As mentioned above, one of the previous search conditions may be replaced with the present search condition. In step 482, the current flag is moved to the added search state record.

In step 484, the search target database 132 is searched with the search conditions set in the search state record with the current flag in the search state management table.

For voice input (A) of Table 2, a search state record containing search conditions to which the search condition "category: Chinese" is appended is added to the search state management table. The current flag field of the search state record in which the current flag field is currently set to 1 is set to 0, and the current flag field of the newly added search target record is set to 1. Then, a search of the search target database 132 is conducted with the new search conditions.

For voice input (B) of Table 2, a search state record containing search conditions to which the search condition "budget: 0-4,000 yen" is appended is added to the search state management table. The current flag field of the search state record in which the current flag field is currently set to 1 is set to 0, and the current flag field of the newly added search state record is set to 1. Then, a search of the search target database 132 is conducted with the new search conditions.

The search results may be memorized in the memory section 152 in correspondence with the search conditions. For example, a search result field may be provided in the search state management table and the search results stored in the search result field.

Figure 4G:
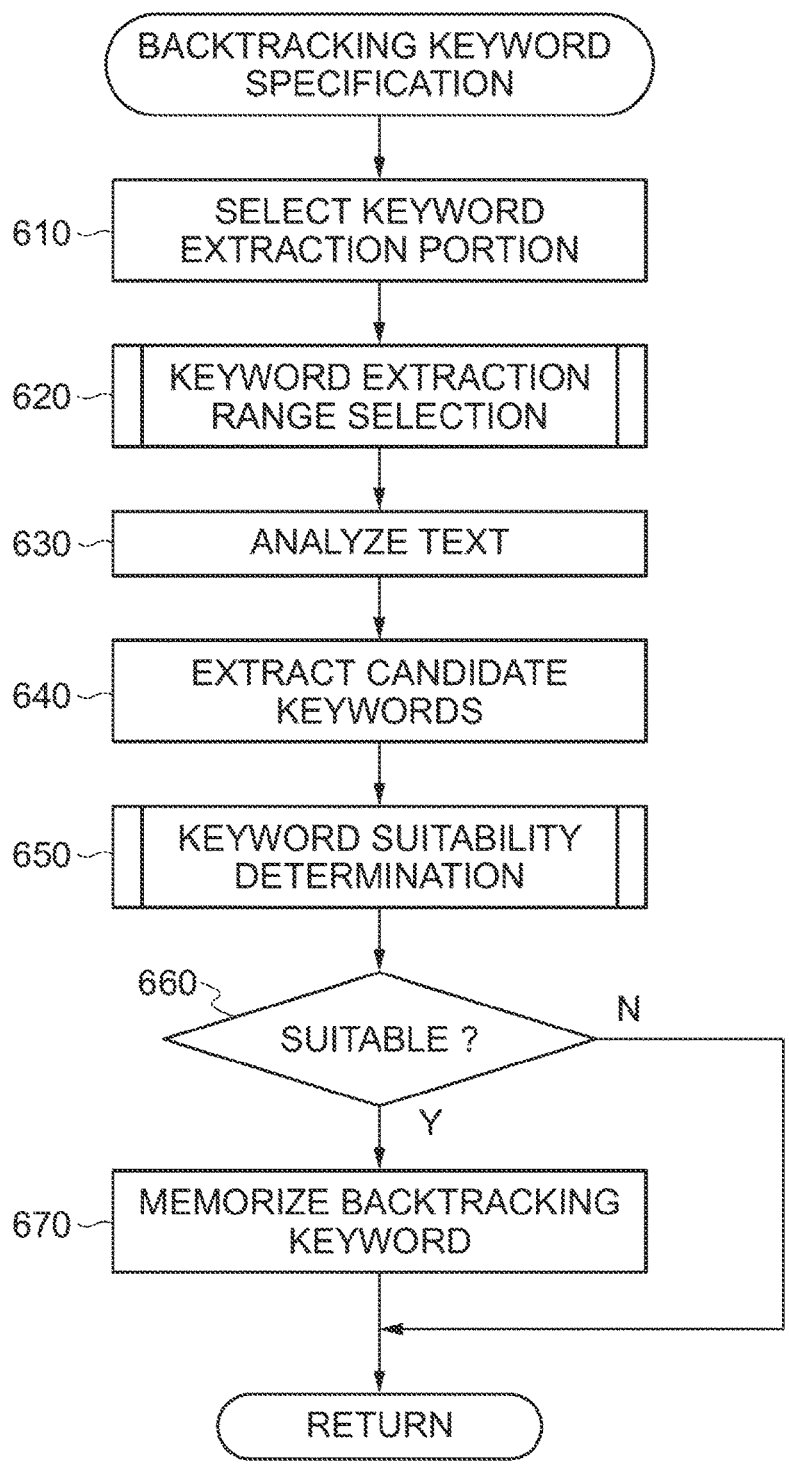
FIG. 4G is a flowchart illustrating a portion of the example of voice input and output database search processing in accordance with the first exemplary embodiment.

After the search of the search target database 132, backtracking keyword specification processing is performed in step 600. Details of the backtracking keyword specification processing of step 600 are illustrated in FIG. 4G.

In the backtracking keyword specification processing, the backtracking keyword specification section 135 specifies backtracking keywords on the basis of the search results obtained in step 484.

In step 610, the keyword extraction portion selection section 210 selects a portion for extracting backtracking keywords from the search results acquired by the database search section 130. For example, if there are a large number of search results, only a few top-ranked search results with high levels of matching to the search conditions may be presented, which is to say outputted in a voice message. In this case, it may be that only words included in these top-ranked search results are used as candidate keywords. Therefore, the top-ranked results may be selected as the portion for extracting backtracking keywords. Alternatively, if, for example, the voice output of the search results is stopped by a user interruption or the like, the search results outputted in the voice message before the interruption may be used as the portion from which backtracking keywords are extracted.

In step 620, the keyword extraction range selection section 215 then selects a range for extracting backtracking keywords from the selected portion. For example, the keyword extraction range selection section 215 may select a range containing text from the portion for extracting backtracking keywords, or may select a pre-specified range. For example, in the case of searching for a restaurant, the keyword extraction range selection section 215 may select a range containing restaurant names, and in a case of searching for a gas station, the keyword extraction range selection section 215 may select a range containing gas prices.

Figure 4H:
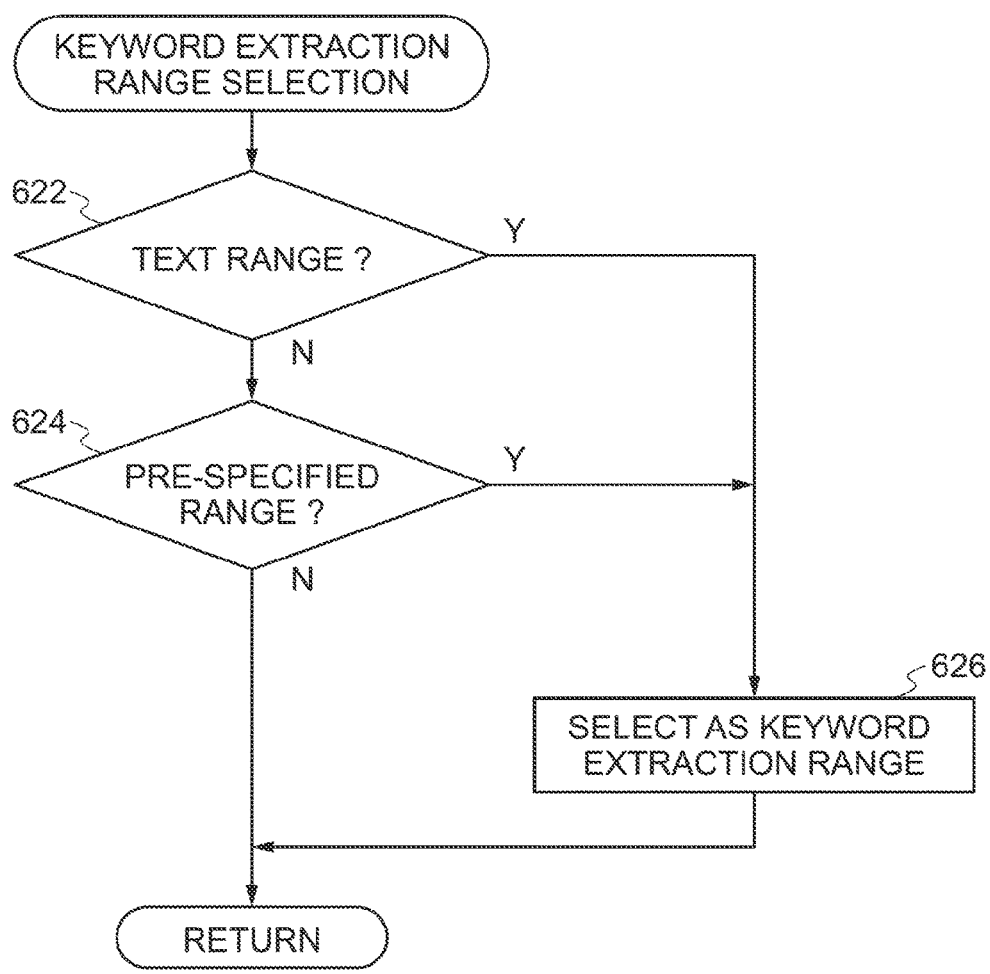
FIG. 4H is a flowchart illustrating a portion of the example of voice input and output database search processing in accordance with the first exemplary embodiment.

As an example, in step 622 of FIG. 4H, if a determination is made that there is a text range in the portion for extracting backtracking keywords, then this text range is selected as a keyword extraction range in step 626. Otherwise, if a determination is made in step 624 that there is a pre-specified range in the portion for extracting backtracking keywords, then this pre-specified range is selected as the keyword extraction range in step 626.

A pre-specified range may be, for example, a range containing data that is included in a predetermined field, which is specified in advance, of the search target table of the search target database 132.

For example, in a restaurant database search, the pre-specified range may be a range including data that is contained in fields such as the name, address and comment or the like, and in a gas station database search, the pre-specified range may be a range that includes data contained in a price field. The data contained in these fields is easy for a user to retain in memory.

In step 630, the text analysis section 220 analyzes the text included in this range. For example, the text analysis section 220 performs a morphological analysis of the text included in the range for extracting backtracking keywords selected by the keyword extraction range selection section 215, and selects words included in the text on the basis of the morphological analysis.

The text analysis section 115 may function as the text analysis section 220.

In step 640, the candidate keyword extraction section 225 extracts respective words included in the text that are obtained as a result of the analysis to be candidate keywords.

As an example, the backtracking keyword memory section 230 specifies that a candidate keyword is suitable to be a backtracking keyword if the candidate keyword is a proper noun, if the candidate keyword has a low frequency of occurrence, or if the candidate keyword is a word included in a pre-specified range.

Proper nouns and low-frequency words are suitable as backtracking keywords because they are easily retained in a user's impressions. Whether a word is a proper noun is identified by, for example, morphological analysis. To identify low-frequency words, for example, a table is created beforehand associating words in the search target database 132 with frequencies of occurrence of those words, and this table is referred to.

Figure 4I:
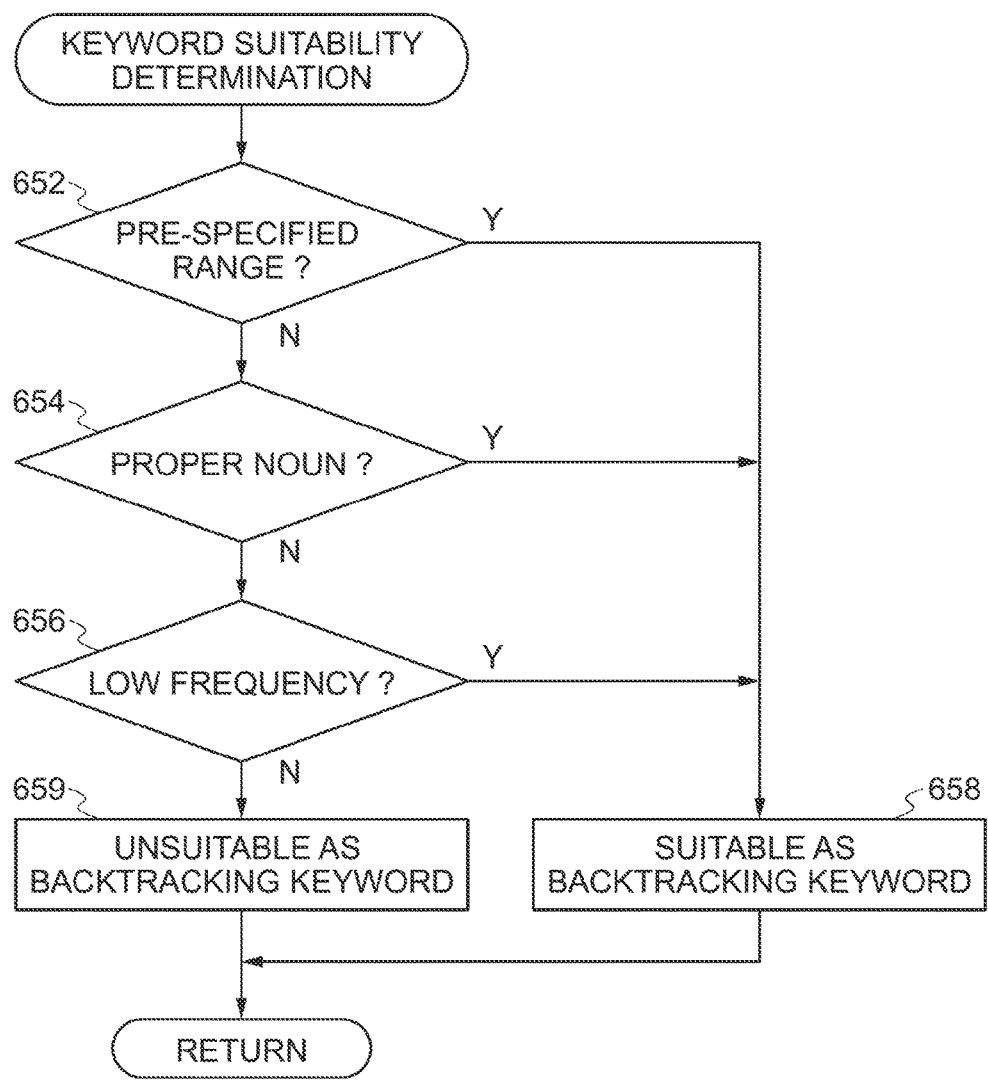
FIG. 4I is a flowchart illustrating a portion of the example of voice input and output database search processing in accordance with the first exemplary embodiment.

In step 650, whether or not a candidate keyword is suitable to be a backtracking keyword is specified. An example of this keyword suitability determination processing is illustrated in FIG. 4I.

In step 652, a determination is made as to whether the candidate keyword is a word included in predetermined fields, which are specified in advance. If the result of this determination is affirmative, in step 658 it is specified that the candidate keyword is suitable to be a backtracking keyword.

If the result of the determination in step 652 is negative, a determination is made in step 654 as to whether the candidate keyword is a proper noun. If the result of this determination is affirmative, in step 658 it is specified that the candidate keyword is suitable to be a backtracking keyword.

If the result of the determination in step 654 is negative, a determination is made in step 656 as to whether the frequency of occurrence of the candidate keyword in the search target database 132 is below a predetermined threshold. If the result of this determination is affirmative, in step 658 it is specified that the candidate keyword is suitable to be a backtracking keyword.

If the result of the determination in step 656 is negative, in step 659 it is specified that the candidate keyword is unsuitable to be a backtracking keyword.

The processing according to FIG. 4I is an example, in which a candidate keyword is determined to be suitable as a backtracking keyword if any of the conditions in steps 652 to 656 is satisfied. However, it may be that a candidate keyword is determined to be suitable as a backtracking keyword only if all of the conditions in steps 652 to 656 are satisfied.

Alternatively, the determination may be made using just one or two of the conditions in steps 652 to 656.

In step 660, a determination is made as to whether the candidate keyword has been specified as being suitable to be a backtracking keyword. If the candidate keyword has been specified as being suitable, the result of the determination in step 660 is affirmative. In this case, in step 670 the backtracking keyword memory section 230 sets the candidate keyword as a backtracking keyword in the backtracking keyword field of the search state management table, in correspondence with an output voice message text field representing the search conditions and search results.

In record No. 3 of the search state management table illustrated in FIG. 6, "Shibuya Chinese Restaurant", "Dogenzaka", and "dumplings" are set as backtracking keywords. In this example, "Shibuya Chinese Restaurant" is a backtracking keyword because the "name" field is specified in advance as a predetermined field, "Dogenzaka" is a backtracking keyword because it is a proper noun, and "dumplings" is a backtracking keyword because its frequency of occurrence in the search target database is below a predetermined value.

Here, an example is illustrated in which the backtracking keyword memory section 230 sets candidate keywords as backtracking keywords in the backtracking keyword field of the search state management table, but this is not restrictive. Candidate keywords that are determined to be suitable may be memorized in the memory section 152 as backtracking keywords in correspondence with search states.

In step 470 of FIG. 4A, the voice output section 167 outputs the search results in a voice message, and the voice input and output database search device 100 returns to step 410. The output voice message text generated for this output voice message is stored in the output voice message text field of the search state management table in correspondence with the search conditions.

For simplicity of description, a case has been described in which there are a single keyword extraction portion, a single keyword extraction range, a single candidate keyword and the like. However, there may be plural numbers of keyword extraction portions, keyword extraction ranges and candidate keywords. When there are plural numbers thereof, the processes described above may be repeated as appropriate.

Also for simplicity of description, the determination specifying whether a candidate keyword is suitable as a backtracking keyword is performed separately by step 658, step 659 and step 660, but this is not restrictive. A determination specifying whether a candidate keyword is suitable as a backtracking keyword may be a single step. All the other steps are also illustrative. Steps may be divided or combined, and the sequence of steps is not restricted.

The first exemplary embodiment represents a database search in accordance with voice inputs and outputs. However, in addition to voice inputs and outputs by the voice input section 165 and the voice output section 167, data may be entered using the text/graphics input section 172, in the form of, for example, a keyboard, a touch panel or the like. Furthermore, data may be outputted using the display section 170, in the form of a display or a printer.

A language to be used for the voice inputs and outputs and various databases of the first exemplary embodiment is not restricted. For example, the language may be one or more of English, Japanese, Chinese and so forth.

According to the disclosed technology, in a voice input and output database search, backtracking keywords for returning to previous search states are appropriately extracted from search results. Therefore, previous search states may be returned to easily and appropriately. As a result, the efficiency of search target database searches may be improved, and the amounts of time taken on search tasks may be reduced.

Second Exemplary Embodiment

Next, a second exemplary embodiment of the disclosed technology is described. The second exemplary embodiment is substantially the same as the first exemplary embodiment, but the keyword suitability determination processing of the first exemplary embodiment (step 650 in FIG. 4G, and step 4I) is partially altered.

Figure 9:
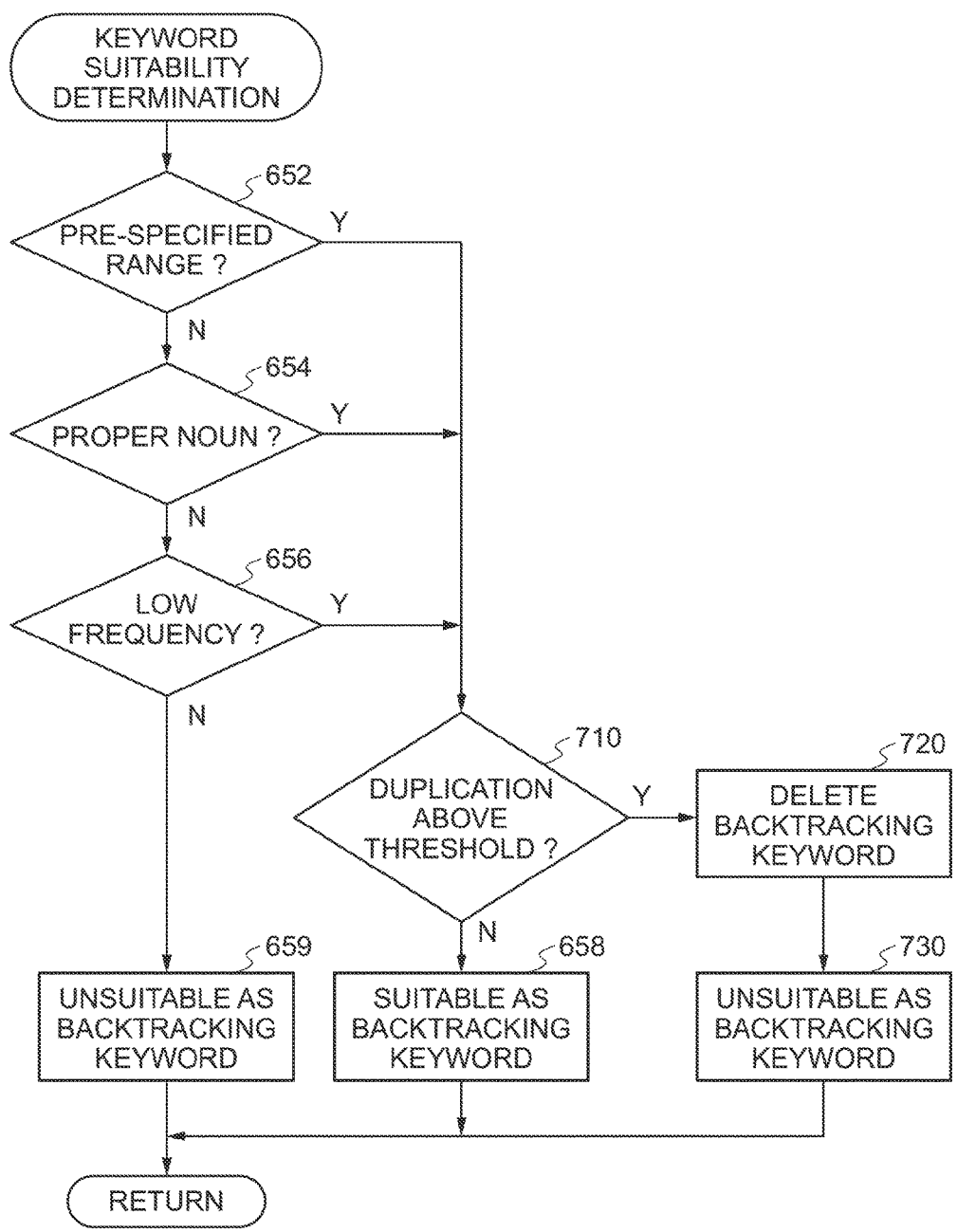
FIG. 9 is a flowchart illustrating an example of keyword suitability determination processing in accordance with a second exemplary embodiment.

The keyword suitability determination processing according to the second exemplary embodiment is illustrated in FIG. 9.

In FIG. 9, a determination in step 710 is applied to a candidate keyword for which the result of a determination in step 652, step 654 or step 656 is affirmative. In step 710, a determination is made as to whether the candidate keyword duplicates a backtracking keyword that has already been set in another search state record associated with a previous search state.

If the candidate keyword has not been set in more than a threshold number of search state records, then in step 658 the candidate keyword is specified as being suitable to be a backtracking keyword.

If a backtracking keyword duplicating the candidate keyword has been set in more than the threshold number of search state records, that is, when the result of the determination of step 710 is affirmative, the processing of step 720 is performed. In step 720, the backtracking keywords duplicating the candidate keyword that have been set in the other search state records are deleted.

In step 730, the candidate keyword is specified as being unsuitable to be a backtracking keyword.

That is, backtracking keywords duplicating the candidate keyword that have already been set in the search state management table are deleted from the search state management table, and the candidate keyword is not memorized in the search state management table.

This is because a backtracking keyword that is duplicated a large number of times represents a large number of previous search states to be backtracked to, as a result of which it is difficult to appropriately return to a desired search state.

In FIG. 10, record No. 2 includes "Dogenzaka" among the backtracking keywords. For record No. 3, "Dogenzaka" is extracted as a candidate keyword. If, as an example, the duplication threshold is 1, the result of the determination in step 710 is affirmative. Hence, in step 720 "Dogenzaka" is deleted from the backtracking keyword field of record No. 2. Then, in step 730 "Dogenzaka" is specified as being unsuitable to be a backtracking keyword. Therefore, in step 670 "Dogenzaka" is not set in the backtracking keyword field of record No. 3.

The duplication threshold may be set arbitrarily.

Third Exemplary Embodiment

Next, a third exemplary embodiment of the disclosed technology is described. The second exemplary embodiment and the third exemplary embodiment are similar in that backtracking keywords set in the search state management table that duplicate a candidate keyword are deleted from the search state management table. However, while the candidate keyword is specified as being unsuitable to be a backtracking keyword in the second exemplary embodiment, in the third exemplary embodiment the candidate keyword is specified as being suitable to be a backtracking keyword.

In FIG. 11, the determination of step 710 is applied to a candidate keyword for which the result of a determination in step 652, step 654 or step 656 is affirmative. That is, in step 710 a determination is made as to whether the candidate keyword duplicates a backtracking keyword that has already been set in another search state record associated with a previous search state.

If a backtracking keyword duplicating the candidate keyword has been set in more than the threshold number of search state records, that is, when the result of the determination of step 710 is affirmative, the processing of step 720 is performed. In step 720, the backtracking keywords duplicating the candidate keyword that have been set in the other search state records are deleted.

The processing so far is the same as in the second exemplary embodiment. However, in step 740, the candidate keyword is specified as being suitable to be a backtracking keyword. This processing is different from that of the second exemplary embodiment.

That is, backtracking keywords duplicating the candidate keyword that have been set in other search state records are deleted from the other search state records, and the candidate keyword is memorized in the new search state record.

If there are a large number of duplicated backtracking keywords, the difficulty of appropriately returning to a desired search state may be avoided by keeping the backtracking keyword only in association with a recent search state. Moreover, when there are a large number of duplicated backtracking keywords, the need to return to a more recent search state may be satisfied by keeping the backtracking keyword only in association with the recent search state.

In FIG. 12, record No. 2 includes "Dogenzaka" among the backtracking keywords. For record No. 3, "Dogenzaka" is extracted as a candidate keyword. If, as an example, the duplication threshold is 1, in step 720 "Dogenzaka" is deleted from the backtracking keyword field of record No. 2. In step 740, "Dogenzaka" is specified as being suitable to be a backtracking keyword. Hence, in step 670 "Dogenzaka" is set in the backtracking keyword field of record No. 3.

The duplication threshold may be set arbitrarily.

Fourth Exemplary Embodiment

Figure 13:
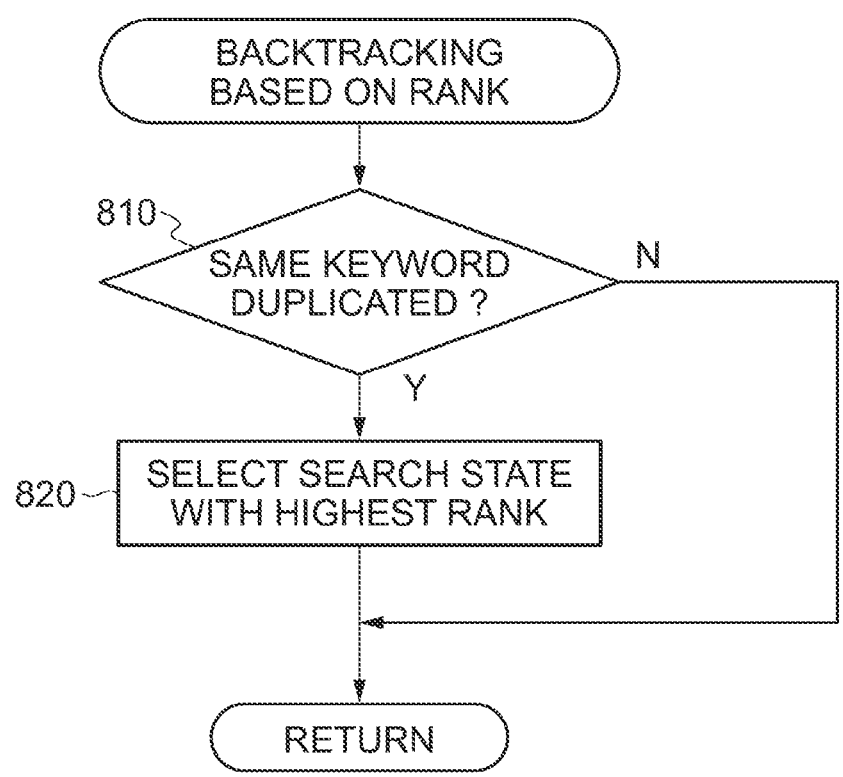
FIG. 13 is a flowchart illustrating an example of backtracking processing based on rank in accordance with a fourth exemplary embodiment.

Next, a fourth exemplary embodiment of the disclosed technology is described. The fourth exemplary embodiment is substantially the same as the first exemplary embodiment. However, between the pre-backtracking processing of step 430 and the post-backtracking processing of step 440 that are illustrated in FIG. 4A in accordance with the first exemplary embodiment, the fourth exemplary embodiment includes backtracking processing based on rank. Details of the backtracking processing based on rank are illustrated in FIG. 13.

In the fourth exemplary embodiment, a search state management table of which an example is illustrated in FIG. 14 is used. In the search state management table illustrated in FIG. 14, when a backtracking keyword is set in the search state management table, a rank of the search result from which the backtracking keyword is extracted is set in correspondence with the respective backtracking keyword. Herein, an example is illustrated in which the rank of a search result is higher when the level of matching thereof to the search conditions is higher. That is, the higher the level of matching, the lower a number representing the rank.

In record No. 3, rank fields corresponding to the backtracking keywords "Shibuya Chinese Restaurant", "Dogenzaka", and "dumplings" are set to 1, indicating that these backtracking keywords have been extracted from a search result whose rank is 1.

Meanwhile, the rank fields corresponding to the backtracking keywords "Batsu Garden", "Udagawacho", and "all you can eat" are set to 2, indicating that these backtracking keywords have been extracted from a search result whose rank is 2.

In record No. 4, the rank fields corresponding to the backtracking keywords "Batsu Garden", "Udagawacho", and "all you can eat" are set to 1, indicating that these backtracking keywords have been extracted from a search result whose rank is 1.

In step 810 of FIG. 13, a determination is made as to whether there is a plural number of search state records containing a backtracking keyword the same as the candidate keyword. If the result of the determination of step 810 is negative, a backtracking search state is uniquely identified. Accordingly, the backtracking processing based on rank ends.

If the result of the determination of step 810 is affirmative, a search state record with the smallest number in a rank field that has been set in correspondence with the backtracking keyword that is the same as the candidate keyword is selected. That is, in step 820, the search state record in which this backtracking keyword has the highest rank is selected. In step 442, the current flag is moved to this search state record in which the rank is highest.

This is because keywords that are contained in search results that are higher in rank are easier for a user to retain in memory.

For example, if a voice input is "back to Batsu Garden", "Batsu Garden" has been included in the backtracking keyword fields of records No. 3 and No. 4. Accordingly, in step 810, it is determined that there are a plural number of search state records that include a backtracking keyword the same as the candidate keyword. The number in the rank field corresponding with "Batsu Garden" in record No. 3 is 2, and the number in the rank field corresponding with "Batsu Garden" in record No. 4 is 1. Therefore, in step 820, search state record No. 4 is selected, and in step 442 of FIG. 4D, the current flag is moved to record No. 4 rather than record No. 3. This is because the rank number set in correspondence with the backtracking keyword "Batsu Garden" is smaller (i.e., the rank is higher) in record No. 4.

In FIG. 14, an example is illustrated in which, when the level of matching to search conditions is higher, a smaller number is set for the rank of a search result, and thus in the rank field of the search state management table. However, as another example, a larger number may be set for the rank of a search result, and thus in the rank field of the search state management table, when the level of matching to search conditions is higher.

An example has been illustrated in which the fourth exemplary embodiment is applied to the first exemplary embodiment. However, the fourth exemplary embodiment may be applied to, for example, a mode of the first exemplary embodiment to which the second or third exemplary embodiment has been applied.

Fifth Exemplary Embodiment

Next, a fifth exemplary embodiment of the disclosed technology is described. The fifth exemplary embodiment is substantially the same as the first exemplary embodiment. However, backtracking keyword list generation processing, which is illustrated in FIG. 15, is included directly after the pre-search processing of step 410 of FIG. 4A in accordance with the first exemplary embodiment.

Figure 15:
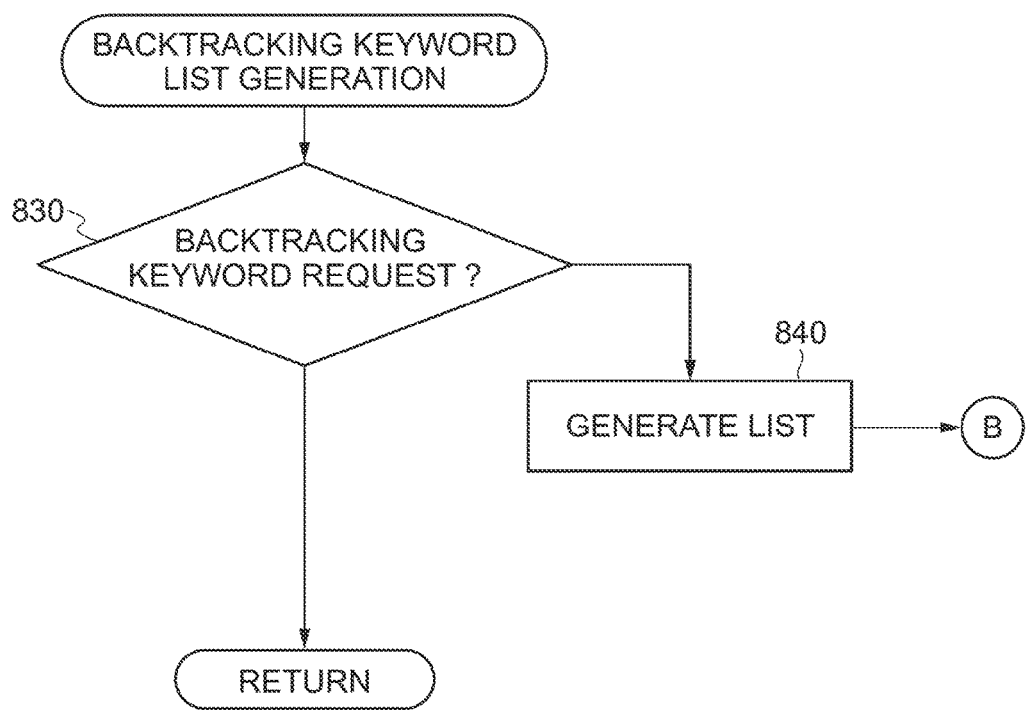
FIG. 15 is a flowchart illustrating an example of backtracking keyword list generation processing in accordance with a fifth exemplary embodiment.

In step 830 of FIG. 15, a determination is made as to whether an input voice message is a request for a backtracking keyword check. If the result of the determination is affirmative, in step 840, a list of backtracking keywords is generated from the data of the backtracking keyword field in the search state management table.

In the search condition definition table illustrated in FIG. 5, "keyword check" is set in the search condition/processing field in correspondence with "keywords" and "teach" in the input word set field. Thus, if "keywords" and "teach" are included in an input voice message, it is determined in step 830 that a backtracking keyword check is requested.

Note that "keywords" and "teach" or the like is an example, and this is not restrictive.

For example, from the data in the backtracking keyword fields of the search state management table illustrated in FIG. 6, a list including "Dining A", "Jinnan", "parties", "Kaio", "Sakuragaokacho", "fresh seafood", etc. is generated.

In step 472 of FIG. 4E, these words are applied to the template in FIG. 8. That is, the list of backtracking keywords includes information corresponding to the "backtracking keyword 1", "backtracking keyword 2", "backtracking keyword 3", "backtracking keyword 4", etc. included in the substitution information field. Therefore, these are applied to the corresponding output voice message template, that is: "The following words may be used as backtracking keywords: [backtracking keyword 1], [backtracking keyword 2], [backtracking keyword 3], [backtracking keyword 4] . . . ." Thus, a text is generated saying "The following words may be used as backtracking keywords: Dining A, Jinnan, parties, Kaio, Sakuragaokacho, fresh seafood, . . . ". In step 474, the generated text is voice-synthesized, and in step 476 the text is outputted in a voice message through the voice output section 167.

The burden on a user of remembering backtracking keywords may be moderated by a list of the backtracking keywords being outputted in a voice message.

An example has been illustrated in which the fifth exemplary embodiment is applied to the first exemplary embodiment. However, the fourth exemplary embodiment may be applied to, for example, a mode of the first exemplary embodiment to which any of the second exemplary embodiment, the third exemplary embodiment or the fourth exemplary embodiment has been applied, or may be applied to a mode of the first exemplary embodiment to which a combination of the second and fourth exemplary embodiments has been applied or to which a combination of the third and fourth exemplary embodiments has been applied.

Sixth Exemplary Embodiment

Next, a sixth exemplary embodiment is described.

Figure 16:
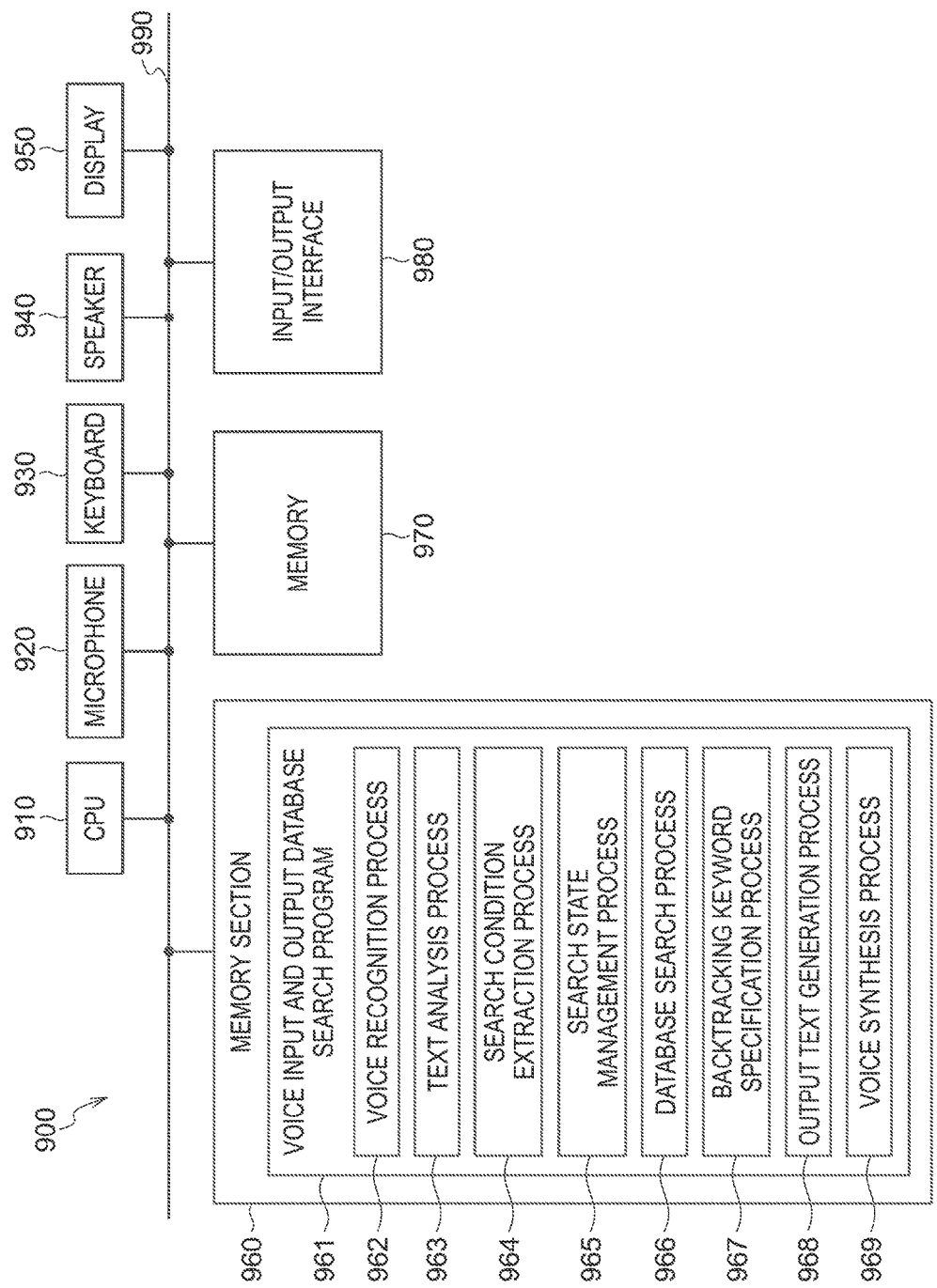
FIG. 16 is a block diagram illustrating an example of a voice input and output database search device in accordance with a sixth exemplary embodiment.

The voice input and output database and search device according to the sixth exemplary embodiment may be implemented by, for example, a computer 900 illustrated in FIG. 16. The computer 900 is equipped with a central processing unit (CPU) 910, a microphone 920, a keyboard 930, a speaker 940, a display 950, a non-volatile memory section 960, a memory 970 and an input/output interface 980. These are connected to one another via a bus 990. The memory section 960 may be realized by a hard disk drive (HDD), flash memory or the like.

A voice input and output database search program 961 for causing the computer 900 to function as the voice input and output database search device is memorized in the memory section 960. The CPU 910 reads the voice input and output database search program 961 from the memory section 910 and loads the voice input and output database search program 961 into the memory 970, and processes included in the voice input and output database search program 961 are executed in sequence.

The voice input and output database search program 961 includes a voice recognition process 962, a text analysis process 963, a search condition extraction process 964, a search state management process 965, a database search process 966 and a backtracking keyword specification process 967. The voice input and output database search program 961 further includes an output text generation process 968 and a voice synthesis process 969.

By executing the voice recognition process 962, the CPU 910 operates as the voice recognition section 105 illustrated in FIG. 1. By executing the text analysis process 963, the CPU 910 operates as the text analysis section 115 illustrated in FIG. 1. By executing the search condition extraction process 964, the CPU 910 operates as the search condition extraction section 120 illustrated in FIG. 1. By executing the search state management process 965, the CPU 910 operates as the search state management section 125 illustrated in FIG. 1. By executing the database search process 966, the CPU 910 operates as the database search section 130 illustrated in FIG. 1. By executing the backtracking keyword specification process 967, the CPU 910 operates as the backtracking keyword specification section 135 illustrated in FIG. 1. By executing the output text generation process 968, the CPU 910 operates as the output text generation section 140 illustrated in FIG. 1. By executing the voice synthesis process 969, the CPU 910 operates as the voice synthesis section 145 illustrated in FIG. 1. Thus, the computer 900 executing the voice input and output database search program 961 functions as the voice input and output database search device.

Hereabove, a mode is described in which the voice input and output database search program 961 is pre-memorized (installed) in the memory section 960, but this is not restrictive. For example, the voice input and output database search program 961 may be provided in a form that is recorded on a recording medium such as a CD-ROM, a DVD-ROM or the like. In this case, a CD-ROM drive, a DVD-ROM drive or the like is connected via the input/output interface 980, and the voice input and output database search program 961 is loaded into the memory 970 from the recording medium. Further, the voice input and output database search program 961 may be acquired from remote network storage via the input/output interface 980 and loaded into the memory 970.

The sixth exemplary embodiment may be applied to any of the first exemplary embodiment, the second exemplary embodiment, the third exemplary embodiment, the fourth exemplary embodiment and the fifth exemplary embodiment.

The disclosed technology has an effect in one regard in that a desired search state may be returned to easily and appropriately.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A voice input and output database search method comprising:
   (a) by a processor, recognizing a search condition provided by a voice message;
   (b) by the processor, outputting a voice message representing a search result acquired by searching a database in accordance with the recognized search condition;
   (c) by the processor, extracting at least one candidate keyword represented by a word or phrase from text information included in the search result;

(d) by the processor, memorizing in a memory the at least one candidate keyword as a backtracking keyword, the backtracking keyword returns to a predetermined state that includes the recognized search condition and the search result from which the candidate keyword is extracted, when at least one of the candidate keyword is a proper noun, a frequency of occurrence of the candidate keyword in the database is not more than a predetermined value, and the candidate keyword is in a predetermined field of the database;

(e) by the processor, after a new search condition that is different from the search condition and is provided by a voice message has been recognized and a search has been conducted in accordance with this recognized search condition, when a backtracking keyword represented by a word or phrase is recognized together with a backtracking directive that is represented by a word or phrase and that instructs to backtrack to a previous search state, controlling on the basis of memory contents memorized in the memory so as to backtrack to a search state memorized in correspondence with a candidate keyword that corresponds to the recognized backtracking keyword; and (f) by the processor, after backtracking to the previous search state, recognizing a new search condition and outputting a voice message representing a new search result included in a new search state through a speaker.

2. The voice input and output database search method of claim 1, wherein the candidate keyword is determined to be suitable as a backtracking keyword that backtracks to the predetermined search state when a number of search states memorized in correspondence with the candidate keyword does not exceed a predetermined number.

3. The voice input and output database search method of claim 2, wherein, when the number of search states memorized in correspondence with the candidate keyword is at least the predetermined number, the candidate keyword that has been memorized in correspondence with these search states is deleted from the memory section and the candidate keyword is determined to be suitable as a backtracking keyword that backtracks to the predetermined search state.

4. The voice input and output database search method of claim 2, wherein, when the number of search states memorized in correspondence with the candidate keyword is at least the predetermined number, the candidate keyword that has been memorized in correspondence with these search states is deleted from the memory section and the candidate keyword is determined not to be suitable as a backtracking keyword that backtracks to the predetermined search state.

5. The voice input and output database search method of claim 1, wherein the search result includes a plurality of search results to which ranks are assigned, when the candidate keyword is memorized in correspondence with the search state, the candidate keyword is memorized together with the rank of the search result from which the candidate keyword is extracted, and the controlling so as to backtrack to the search state that corresponds to the recognized backtracking keyword includes, when a backtracking keyword that corresponds to a candidate keyword corresponding with at least two search states is provided by a voice message, controlling so as to backtrack to, of the at least two search states corresponding with the candidate keyword that corresponds to the inputted backtracking keyword, the search state with the higher rank.

6. The voice input and output database search method of claim 1, wherein, when a backtracking keyword output request is provided by a voice message, control is performed so as to output the candidate keyword memorized in correspondence with the search state by a voice message.

7. A computer-readable recording medium having stored therein a program for causing a computer to execute a voice input and output database search process, the process comprising:

(a) recognizing a search condition provided by a voice message;

(b) outputting a voice message representing a search result acquired by searching a database in accordance with the recognized search condition;

(c) extracting at least one candidate keyword represented by a word or phrase from text information included in the search result;

(d) memorizing in memory at least one candidate keyword as a backtracking keyword, the backtracking keyword returns to a predetermined state that includes the recognized search condition and the search result from which the candidate keyword is extracted, when at least one of the candidate keyword is a proper noun, a frequency of occurrence of the candidate keyword in the database is not more than a predetermined value, and the candidate keyword is in a predetermined field of the database;

(e) after a new search condition that is different from the search condition and is provided by a voice message has been recognized and a search has been conducted in accordance with this recognized search condition, when a backtracking keyword represented by a word or phrase is recognized together with a backtracking directive that is represented by a word or phrase and that instructs to backtrack to a previous search state, controlling on the basis of memory contents memorized in the memory so as to backtrack to a search state memorized in correspondence with a candidate keyword that corresponds to the recognized backtracking keyword; and (f) after backtracking to the previous search state, recognizing a new search condition and outputting a voice message representing a new search result included in a new search state through a speaker.

8. The computer-readable recording medium of claim 7, wherein the candidate keyword is determined to be suitable as a backtracking keyword that backtracks to the predetermined search state when a number of search states memorized in correspondence with the candidate keyword does not exceed a predetermined number.

9. The computer-readable recording medium of claim 8, wherein, when the number of search states memorized in correspondence with the candidate keyword is at least the predetermined number, the candidate keyword that has been memorized in correspondence with these search states is deleted from the memory section and the candidate keyword is determined to be suitable as a backtracking keyword that backtracks to the predetermined search state.

10. The computer-readable recording medium of claim 8, wherein, when the number of search states memorized in correspondence with the candidate keyword is at least the predetermined number, the candidate keyword that has been memorized in correspondence with these search states is deleted from the memory section and the candidate keyword is determined not to be suitable as a backtracking keyword that backtracks to the predetermined search state.

11. The computer-readable recording medium of claim 7, wherein the search result includes a plurality of search results to which ranks are assigned, when the candidate keyword is memorized in correspondence with the search state, the candidate keyword is memorized together with the rank of the search result from which the candidate keyword is extracted, and the controlling so as to backtrack to the search state that corresponds to the recognized backtracking keyword includes, when a backtracking keyword that corresponds to a candidate keyword corresponding with at least two search states is provided by a voice message, controlling so as to backtrack to, of the at least two search states corresponding with the candidate keyword that corresponds to the inputted backtracking keyword, the search state with the higher rank.

12. The computer-readable recording medium of claim 7, wherein, when a backtracking keyword output request is provided by a voice message, control is performed so as to output the candidate keyword memorized in correspondence with the search state by a voice message.

13. A voice input and output database search device comprising:

a processor; and a memory storing instructions, which when executed by the processor perform a procedure, the procedure including:

(a) recognizing a search condition provided by a voice message;

(b) outputting a voice message representing a search result acquired by searching a database in accordance with the recognized search condition;

(c) extracting at least one candidate keyword represented by a word or phrase from text information included in the search result;

(d) memorizing in the memory at least one candidate keyword as a backtracking keyword, the backtracking keyword returns to a predetermined state that includes the recognized search condition and the search result from which the candidate keyword is extracted, when at least one of the candidate keyword is a proper noun, a frequency of occurrence of the candidate keyword in the database is not more than a predetermined value, and the candidate keyword is in a predetermined field of the database;

(e) after a new search condition that is different from the search condition and is provided by a voice message has been recognized and a search has been conducted in accordance with this recognized search condition, when a backtracking keyword represented by a word or phrase is recognized together with a backtracking directive that is represented by a word or phrase and that instructs to backtrack to a previous search state, controlling on the basis of memory contents memorized in the memory so as to backtrack to a search state memorized in correspondence with a candidate keyword that corresponds to the recognized backtracking keyword; and (f) after backtracking to the previous search state, recognizing a new search condition and outputting a voice message representing a new search result included in a new search state through a speaker.

14. The voice input and output database search device of claim 13, wherein the candidate keyword is determined to be suitable as a backtracking keyword that backtracks to the predetermined search state when a number of search states memorized in correspondence with the candidate keyword does not exceed a predetermined number.

* * * * *